United States Patent
King et al.

(10) Patent No.: US 7,258,437 B2
(45) Date of Patent: Aug. 21, 2007

(54) PHOTOCHROMIC MULTIFOCAL OPTICAL ARTICLE

(75) Inventors: Eric M. King, Pittsburgh, PA (US); Kevin J. Stewart, Murrysville, PA (US)

(73) Assignee: Transitions Optical, Inc., Pinellas Park, FL (US)

( * ) Notice: Subject to any disclaimer, the term of this patent is extended or adjusted under 35 U.S.C. 154(b) by 0 days.

(21) Appl. No.: 11/221,207

(22) Filed: Sep. 7, 2005

(65) Prior Publication Data

US 2007/0052922 A1    Mar. 8, 2007

(51) Int. Cl.
*G02C 7/10* (2006.01)
*G02C 7/06* (2006.01)

(52) U.S. Cl. .............. 351/164; 351/168; 351/177
(58) Field of Classification Search ............. 351/168, 351/161
See application file for complete search history.

(56) References Cited

U.S. PATENT DOCUMENTS

| | | | |
|---|---|---|---|
| 4,102,942 A | 7/1978 | Smith et al. | |
| 4,139,578 A | 2/1979 | Baughman et al. | |
| 4,190,621 A | 2/1980 | Greshes | |
| 4,288,149 A | 9/1981 | Campbell | |
| 4,306,780 A | 12/1981 | Tarumi et al. | |
| 4,425,403 A | 1/1984 | Taniguchi et al. | |
| 4,528,351 A | 7/1985 | Tarumi et al. | |
| 4,544,572 A | 10/1985 | Sandvig et al. | |
| 4,645,317 A | 2/1987 | Frieder et al. | |
| 4,679,918 A * | 7/1987 | Ace | 351/163 |
| 4,873,029 A | 10/1989 | Blum | |
| 4,892,403 A | 1/1990 | Merle | |
| 4,944,584 A | 7/1990 | Maeda et al. | |
| 5,178,800 A * | 1/1993 | Blum | 264/1.38 |
| 5,214,116 A * | 5/1993 | Matsuoka et al. | 526/286 |
| 5,219,497 A | 6/1993 | Blum | |
| 5,223,862 A | 6/1993 | Dasher et al. | |
| 5,319,007 A | 6/1994 | Bright | |
| 5,358,672 A | 10/1994 | Blum | |
| 5,366,668 A | 11/1994 | Cuthbertson et al. | |
| 5,405,557 A | 4/1995 | Kingsbury | |
| 5,406,341 A | 4/1995 | Blum et al. | |
| 5,418,301 A | 5/1995 | Hult et al. | |
| 5,446,073 A | 8/1995 | Jonsson et al. | |
| 5,470,892 A * | 11/1995 | Gupta et al. | 522/42 |
| 5,517,259 A | 5/1996 | Blum et al. | |
| 5,523,030 A | 6/1996 | Kingsbury | |
| 5,531,940 A | 7/1996 | Gupta et al. | |
| 5,658,501 A | 8/1997 | Kumar et al. | |
| 5,663,247 A | 9/1997 | Sorensen et al. | |
| 5,679,756 A * | 10/1997 | Zhu et al. | 528/65 |
| 5,702,819 A | 12/1997 | Gupta et al. | |
| 5,708,064 A | 1/1998 | Coleman et al. | |
| 5,736,609 A | 4/1998 | Irizato et al. | |
| 5,757,459 A | 5/1998 | Bhalakia et al. | |
| 5,827,614 A | 10/1998 | Bhalakia et al. | |
| 5,856,860 A | 1/1999 | Bhalakia et al. | |
| 5,861,934 A | 1/1999 | Blum et al. | |
| 5,910,375 A | 6/1999 | Parker et al. | |
| 5,962,617 A | 10/1999 | Slagel | |
| 6,025,026 A | 2/2000 | Smith et al. | |
| 6,034,150 A | 3/2000 | Hoyle et al. | |
| 6,093,777 A | 7/2000 | Sorensen et al. | |
| 6,123,422 A | 9/2000 | Menezes et al. | |
| 6,172,140 B1 | 1/2001 | Toh et al. | |
| 6,194,511 B1 | 2/2001 | Momoda et al. | |
| 6,225,021 B1 | 5/2001 | Widawski et al. | |
| 6,225,404 B1 | 5/2001 | Sorensen et al. | |
| 6,256,152 B1 | 7/2001 | Coldrey et al. | |
| 6,306,923 B1 | 10/2001 | Thepot et al. | |
| 6,328,446 B1 | 12/2001 | Bhalakia et al. | |
| 6,352,747 B1 * | 3/2002 | Blackburn et al. | 427/425 |
| 6,369,124 B1 | 4/2002 | Hoyle et al. | |
| 6,390,621 B1 | 5/2002 | Maki et al. | |
| 6,410,611 B1 | 6/2002 | Sakurai et al. | |
| 6,417,322 B1 | 7/2002 | Jallouli et al. | |
| 6,472,488 B2 | 10/2002 | Caye et al. | |
| 6,503,631 B1 * | 1/2003 | Faverolle et al. | 428/447 |
| 6,505,934 B1 * | 1/2003 | Menezes | 351/169 |
| 6,531,076 B2 | 3/2003 | Crano et al. | |
| 6,596,836 B2 | 7/2003 | Kitahara et al. | |
| 6,602,603 B2 | 8/2003 | Welch et al. | |

(Continued)

FOREIGN PATENT DOCUMENTS

EP    0 878 482 A1    11/1998

(Continued)

*Primary Examiner*—Jordan M. Schwartz
(74) *Attorney, Agent, or Firm*—Linda Pingitore; Deborah M. Altman

(57) ABSTRACT

Describes a multifocal optical article, e.g., an ophthalmic article such as a lens, in which the article includes (1) a rigid optical substrate, e.g., a transparent polymeric substrate, such as a thermoset or thermoplastic substrate, adapted to possess at least one light influencing property on at least a portion of at least one surface of the substrate, e.g., a photochromic and/or polarizing layer, and (2) a multifocal layer of an optical quality material on said substrate having the light influencing property. Describes also the afore-described optical article having an abrasion-resistant coating on the multifocal layer, e.g., an abrasion-resistant coating comprising an organo silane. A method for preparing the multifocal optical article comprising curing optical quality material between a multifocal mold and a preform comprising an optical substrate possessing the light influencing property is also described.

11 Claims, No Drawings

U.S. PATENT DOCUMENTS

| | | |
|---|---|---|
| 6,696,540 B2 | 2/2004 | Okubo et al. |
| 6,706,894 B2 | 3/2004 | Okubo et al. |
| 6,709,107 B2 | 3/2004 | Jiang et al. |
| 6,814,896 B2 | 11/2004 | Bhalakia et al. |
| 6,863,844 B2 | 3/2005 | Engardio et al. |
| 6,863,848 B2 | 3/2005 | Engardio et al. |
| 2002/0151652 A1 | 10/2002 | Adedeji |
| 2003/0073755 A1 | 4/2003 | Garnett et al. |
| 2003/0165686 A1 | 9/2003 | Blackburn et al. |
| 2005/0215757 A1* | 9/2005 | Kobayashi et al. ......... 528/323 |

FOREIGN PATENT DOCUMENTS

| | | |
|---|---|---|
| WO | WO99/03930 | 3/1998 |
| WO | WO 00/77070 A2 | 6/2000 |
| WO | WO 00/64975 | 12/2000 |
| WO | WO 02/22700 A2 | 6/2001 |
| WO | WO 01/68602 A1 | 12/2001 |
| WO | WO 03/58300 A1 | 8/2002 |

\* cited by examiner

PHOTOCHROMIC MULTIFOCAL OPTICAL ARTICLE

CROSS-REFERENCE TO RELATED APPLICATIONS

This application is related to U.S. patent application Ser. No. 10/793,589, filed Mar. 4, 2004 for Photochromic Optical Article, and U.S. patent application Ser. No. 10/793,588 filed Mar. 4, 2004 for Photochromic Optical Article.

FIELD OF THE INVENTION

The present invention relates to multifocal optical articles. More particularly, the present invention relates to multifocal optical articles having a light influencing function. Still more particularly, the present invention relates to multifocal ophthalmic articles, e.g., ophthalmic lenses, having a light influencing function that, in non-limiting embodiments, can be chosen from a photochromic, polarizing, tint, and/or other light modifying functions.

BACKGROUND OF THE INVENTION

Clear ophthalmic articles that provide good imaging qualities, while reducing the transmission of incident light into the eye, are needed for a variety of applications, including but not limited to, sun lenses, plano lenses, fashion lenses, and vision correcting ophthalmic lenses, e.g., prescription lenses. Responsive to that need, photochromic plastic ophthalmic articles have been given considerable attention because of the weight advantage they offer, vis-à-vis, glass lenses.

Photochromism is a phenomenon involving a reversible change in color of a photochromic organic or inorganic material, e.g., a chromene or silver halide salt, or an article comprising such a material. Upon exposure to a source of activating ultraviolet or other actinic radiation, a photochromic material exhibits a change in color, e.g., it becomes darker. When the activating radiation is removed or discontinued, the photochromic material returns to its original color or colorless state. Articles that have photochromic material(s) applied to or incorporated within the article exhibit this reversible change in color and consequently a reversible change in light transmission.

Photochromic plastic ophthalmic articles have been prepared by incorporating photochromic material into the substrate of the plastic article by an imbibition process. In the imbibition process, one or more photochromic materials, e.g., organic photochromic materials, are applied to the surface of the plastic article, either as a neat photochromic dye/compound or dissolved or dispersed in a polymeric or other organic solvent carrier, and then heated to cause the photochromic dye/compound(s) to diffuse into the subsurface region of the plastic article. The subsurface region of such plastic articles are reported to have sufficient free volume to allow photochromic dye/compound(s) to transform from the colorless form into the colored form, and then revert subsequently to their original colorless form.

There are, however, certain polymer matrices that do not readily imbibe photochromic dye/compound(s). In such circumstances, the photochromic dye/compound(s) either do not penetrate sufficiently into the subsurface of the polymer, or the subsurface of the polymer is reported to have insufficient free volume, which prevents the photochromic dye/compound(s) from exhibiting significant photochromic activity. Hence, these polymer matrices cannot be used as a substrate for imbibed (or internally incorporated) photochromic materials for commercially acceptable photochromic optical applications. To allow the use of such polymer matrices as substrates for photochromic articles, it has been proposed to apply organic photochromic coatings to the surface of such polymer substrates.

Multifocal ophthalmic articles are of significant commercial interest because of the large number of individuals that require multiple optical corrections for their lenses, e.g., bifocal, trifocal and progressive lenses. It is desirable, therefore, to provide photochromic multifocal ophthalmic articles that are prepared from polymers that do not readily imbibe organic photochromic materials. Applying a photochromic coating to the surface of a preformed multifocal article has met with minimum success because of coating imperfections and optical distortions that are located near the multifocal region, e.g., the raised bifocal segment. Ophthalmic articles with such coating imperfections do not meet commercially acceptable "cosmetic standards".

BRIEF SUMMARY OF THE INVENTION

In one non-limiting embodiment of the present invention, there is provided a multifocal optical article comprising (1) a rigid optical substrate adapted to possess at least one light influencing property and (2) a multifocal layer of an optical quality resin on said substrate. In another non-limiting embodiment of the present invention, there is provided a multifocal optical article comprising (1) a rigid optical substrate, (2) a transparent light influencing layer, e.g., a photochromic polymeric coating and/or a polarizing layer, on at least a portion of at least one surface of said rigid optical substrate, and (3) a multifocal layer of an optical quality resin on said light influencing layer.

In a further non-limiting embodiment of the present invention, the aforedescribed multifocal optical articles are prepared by a method that comprises (1) positioning an optical quality resin between and in contact with a multifocal mold and a surface of a preform that comprises a rigid optical substrate adapted to possess at least one light influencing property and (2) curing said optical quality resin, thereby to provide a multifocal layer on the surface of said preform.

DETAILED DESCRIPTION OF THE INVENTION

For purposes of this specification (other than in the operating examples), or unless otherwise indicated, ail numbers expressing quantities and ranges of ingredients, reaction conditions, etc, that are used in the following description and claims are to be understood as modified in all instances by the term "about". Accordingly, unless indicated to the contrary, the numerical parameters set forth in this specification and attached claims are approximations that may vary depending upon the results to be obtained by the process and for the properties sought for the articles of the present invention. At the very least, and not as an attempt to limit the application of the doctrine of equivalents to the scope of the attached claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Also, it should be understood that any numerical range recited herein is intended to include all sub-ranges subsumed therein. For example, a range "1 to 10" is intended to include all sub-ranges between and including the recited minimum value of 1 and the recited maximum value of 10; namely, a range having a minimum value equal to or greater than 1 and a maximum value of equal to or less than 10. Because the disclosed ranges are continuous, they include every value between the minimum and maximum values. Unless expressly indicated otherwise, the various numerical ranges specified in this application are, as stated, approximations.

As used in the following description and claims, the following terms have the indicated meanings:

The terms "acrylic" and "acrylate" are used interchangeably (unless to do so would alter the intended meaning) and include acrylic acid, lower alkyl-substituted acrylic acids, e.g., $C_1$-$C_5$ substituted acrylic acids, such as methacrylic acid, ethacrylic acid, etc., and derivatives of such acrylic acids, such as their $C_1$-$C_5$ alkyl esters, unless clearly indicated otherwise. The terms "(meth)acrylic" or "(meth)acrylate" are intended to cover both the acrylic/acrylate and methacrylic/methacrylate forms of the indicated material, e.g., a (meth)acrylate monomer.

The term "cure", "cured" or similar terms, as used in connection with a cured or curable composition, e.g., a "cured composition" of some specific description, means that at least a portion of the polymerizable and/or crosslinkable components that form the curable composition is at least partially polymerized and/or crosslinked. Generally, the curable composition is substantially crosslinked. In a non-limiting embodiment, the degree of crosslinking, can range from 5% to 100% of complete crosliriking. In alternate non-limiting embodiments, the degree of crosslinking can range from 35% to 85%, e.g., 50% to 85%, of full crosslinking. The degree of crosslinking can range between any combination of the previously stated values, inclusive of the recited values.

The term "curable", as used for example in connection with a curable optical resin composition, means that the indicated composition is polymerizable or cross linkable, e.g., by means that include, but are not limited to, thermal, catalytic, electron beam, chemical free-radical initiation, and/or photoinitiation such as by exposure to ultraviolet light.

The term "light influencing function", "light influencing property" or terms of like import means that the indicated material, e.g., coating, film, substrate, etc., is capable of modifying by absorption (or filtering) incident light radiation, e.g., visible, ultraviolet (UV) and/or infrared (IR) radiation that impinges on the material. In alternate non-limiting embodiments, the light influencing function can be light polarization, e.g., by means of a polarizer and/or dichroic dye; a change in light absorption properties, e.g., by use of a chromophore that changes color upon exposure to actinic radiation, such as a photochromic material; transmission of only a portion of the incident light radiation, e.g., by use of a fixed tint such as a conventional dye; or by a combination of one or more of such light influencing functions.

The term "adapted to possess at least one light influencing property", as used for example in connection with a rigid optical substrate, means that the specified item is capable of having the light influencing property incorporated into or appended to it. For example, in alternate non-limiting embodiments, a plastic matrix that is adapted to possess a light influencing property means that the plastic matrix has sufficient internal free volume to accommodate internally a photochromic dye or tint, the surface of such a plastic matrix is capable of having a photochromic or tinted layer, film or coating appended to it, and/or the surface is capable of having a polarizing film appended to it.

The term "multifocal" means that the specified optical article has more than one focal length, e.g., a bifocal, trifocal, progressive or aspheric lens. For example, a multifocal optical lens is a lens that has more than one lens correcting region, e.g., a bifocal lens having an optical segment providing a first lens correction, such as for distance correction, and an optical segment providing a second lens correcting region, such as for reading. Lenses that have an optical segment providing a third lens correction region, such as for a distance between the first and second lens correcting regions, are generally referred to as trifocals.

The terms "on", "appended to", "affixed to", "bonded to", "adhered to", or terms of like import means that the designated item, e.g., a coating, film or layer, is either directly connected to (superimposed on) the object surface, or indirectly connected to the object surface, e.g., through one or more other coatings, films or layers (superposed on).

The term "ophthalmic" refers to elements and devices that are associated with the eye and vision, such as but not limited to, lenses for eyewear, e.g., corrective and non-corrective lenses, and magnifying lenses.

The term "optical quality", as used for example in connection with polymeric materials, e.g., a "resin of optical quality" or "organic polymeric material of optical quality" means that the indicated material, e.g., a polymeric material, resin, or resin composition, is or forms a substrate, layer, film or coating that can be used as an optical article, such as an ophthalmic lens, or in combination with an optical article.

The term "rigid", as used for example in connection with an optical substrate, means that the specified item is self-supporting.

The term "optical substrate" means that the specified substrate exhibits a light transmission value (transmits incident light) of at least 4 percent and exhibits a haze value of less than 1 percent, e.g., less than 0.5 percent, when measured at 550 nanometers by, for example, a Haze Gard Plus Instrument. Optical substrates include, but are not limited to, optical articles such as lenses, optical layers, e.g., optical resin layers, optical films and optical coatings, and optical substrates having a light influencing property.

The term "preform" means a rigid optical substrate that has been adapted to possess at least one light influencing property.

The term "photochromic receptive" means that the indicated item has sufficient free volume to permit photochromic material(s) incorporated within it to transform from its colorless form to its colored form (and then revert to its colorless form).

The term "tinted", as used for example in connection with ophthalmic elements and optical substrates, means that the indicated item contains a fixed light radiation absorbing agent, such as but not limited to, conventional coloring dyes, infrared and/or ultraviolet light absorbing materials on or in the indicated item. The tinted item has an absorption spectrum for visible radiation that does not vary significantly in response to actinic radiation.

The term "non-tinted", as used for example in connection with ophthalmic elements and optical substrates, means that that the indicated item has an absorption spectrum for visible radiation that does not vary significantly in response to actinic radiation.

The term "actinic radiation" includes both visible and ultraviolet radiation.

The term "tinted photochromic", as used for example in connection with ophthalmic elements and optical substrates, means that the indicated item contains a fixed light absorbing agent and a photochromic material. The indicated item has an absorption spectrum for visible radiation that varies in response to actinic radiation and is thermally reversible when the actinic radiation is removed. For example, in one non-limiting embodiment, the tinted photochromic item has a first characteristic of the light absorbing agent, e.g., a coloring tint, and a second color characteristic of the combination of the light absorbing agent and the activated photochromic material when the photochromic material is exposed to actinic radiation.

The term "dichroic material", "dichroic dye" or terms of like import means a material/dye that absorbs one of two orthogonal plane-polarized components of transmitted radiation more strongly than the other. Non-limiting examples of dichroic materials include indigoids, thioindigoids, merocyanines, indans, azo and poly(azo) dyes, benzoquinones, naphthoquinones, anthraquinones, (poly)anthraquinones, anthrapyrimidinones, iodine and iodates. The term "dichroic" is synonymous with "polarizing" or words of like import.

The term "dichroic photochromic" means a specified material or article that exhibits both dichroic and photochromic properties. In alternate non-limiting embodiments, the specified material can include both photochromic dyes/compounds and dichroic dyes/compounds, or single dyes/compounds that possess both photochromic and dichroic properties.

The term "transparent", as used for example in connection with a substrate, film, material and/or coating, means that the indicated substrate, coating, film and/or material has the property of transmitting light without appreciable scattering so that bodies lying beyond are entirely visible. In one non-limiting embodiment, the transparent substrate, coating, film and/or material has a light transmission of at least 70%. In alternate non-limiting embodiments, the transparent item has a light transmission of at least 80%, e.g., at least 85%.

The present invention relates to multifocal optical articles comprising a rigid optical substrate adapted to possess at least one light influencing property and a multifocal layer of an optical quality resin on said substrate. In one non-limiting embodiment, the present invention relates to ophthalmic articles comprising a composite of an optical substrate, e.g., a rigid substrate of glass or organic polymeric material, such as an organic polymer of optical quality, a transparent light influencing coating, e.g., a photochromic polymeric coating and/or polarizing coating, appended to at least a portion of at least one surface of the transparent substrate, and a transparent multifocal layer of an optical quality resin superposed on said light influencing coating.

In a further non-limiting embodiment of the present invention, the previously described multifocal optical, e.g., ophthalmic, article further comprises at least one abrasion-resistant coating superposed on the multifocal optical resin layer. In a still further non-limiting embodiment of the present invention, an additional coating, e.g., an antireflective coating, is superposed on the abrasion-resistant coating. Additional films/coatings can be appended to, e.g., superimposed on or placed below, the antireflective coating to provide additional functional properties to the multifocal article, e.g., antistatic and/or antiwetting coatings.

In alternate non-limiting embodiments, the light influencing property can be chosen from tinting, photochromism, a combination of tinting and photochromism, polarizing, a combination of tinting and polarizing, a combination of photochromism and polarizing, a combination of tinting, photochromism and polarizing, or combinations of one or more of such light influencing properties not specifically described. Generally, the light influencing property is embodied into a coating, film or layer that is appended to the surface of the optical article, e.g., an ophthalmic article such as a lens. However, the light influencing property can be incorporated within the matrix of the optical article.

The multifocal layer is prepared with a curable optical quality resin, e.g., an organic polymerizable composition of optical quality. When cured, the optical quality resin provides a transparent, adherent multifocal layer. In a non-limiting embodiment, the curable multifocal optical quality resin is adapted to adhere coherently to the surface of the preform on which it is placed, e.g., the curable composition can be formulated to contain adhesion promoting additives, e.g., silane coupling agents, that are capable of producing covalent chemical bonds with the surface of the preform (and, if used, an abrasion resistant coating that is placed on the multifocal optical quality resin) to enhance adhesion of the cured optical resin to adjoining surfaces. In an alternate non-limiting embodiment, the process of appending the multifocal resin layer to the surface of the preform can enhance its adhesion to the preform, e.g., by use of heat and/or pressure.

In a non-limiting embodiment of the present invention, the cured multifocal optical resin is compatible with abrasion resistant coatings that may be placed on the cured multifocal optical resin layer. Abrasion resistant coatings, e.g., hard coats, such as those prepared with organo silane-containing compositions, are described elsewhere in this description. By "compatible" is meant that the cured multifocal optical resin is capable of having an abrasion resistant coating, e.g., organo silane-containing hard coat, applied to its surface and that the abrasion resistant coating adheres to the surface of the preform under ordinary handling/wear conditions, as determined by the art recognized cross hatch tape peel adhesion test (ASTM D 3359-02 and ASTM D 870-02), and/or the abrasion resistant coating does not exhibit crazing after being applied and cured.

In one non-limiting embodiment of the present invention, the cured multifocal optical resin layer is resistant to treatment, e.g., removal, by aqueous inorganic caustic solutions, e.g., relatively dilute aqueous alkali metal hydroxide solutions, such as solutions of sodium or potassium hydroxide. The multifocal resin layer is considered to be resistant to removal by such solutions if the thickness of the resin layer is reduced by not more than 0.5 micron after exposure to 12.5% aqueous potassium hydroxide at 140° F. (60° C.) for four minutes. In an alternate non-limiting embodiment, the multifocal resin layer is reduced by not more than 0.5 microns after two or three exposures to the aqueous alkali metal hydroxide solution.

In a non-limiting embodiment of the present invention, the cured multifocal optical quality resin is harder than the subjacent layer possessing the light influencing function, e.g., a photochromic coating or a polarizing layer. The hardness of a layer or coating can be measured for example by a FISCHERSCOPE HCV Model H-100 instrument (available from Fischer Technology, Inc). Values obtained from such measurements are commonly referred to as a Fischer microhardness. The Fischer microhardness is obtained by taking the average of 3 measurements in the center area of a test sample under conditions of a 100 milliNewton load, 30 load steps, and 0.5 second pauses between load steps at an indentor (Vickers diamond stylus) depth of 2 μm (microns).

In one non-limiting embodiment of the present invention, the cured multifocal optical quality resin layer is more scratch resistant than the subjacent layer having the light influencing property, e.g., it is less likely to be penetrated, marred or scratched than the subjacent layer possessing the light influencing property when subjected to rubbing or scraping. The scratch resistance of a layer can be readily determined by a conventional steel wool scratch test, which measures the average haze gain of a surface subjected to abrasion by very fine steel wool. See, for example, ASTM Test Method F735-81. An Eberbach Steel Wool Abrasion Tester can be used to determine surface scratch resistance. A Bayer Abrasion Tester can also be used to determine surface abrasion resistance.

In one non-limiting embodiment, the optical quality resin used to prepare the multifocal layer is curable by radiation, e.g., ultraviolet light or microwave radiation, and/or by a thermal curing process. Generally, the optical quality multifocal resin is a material that cures to the desired degree of cure in a relatively short time span. For example, in one non-limiting embodiment, the cure time for the curable optical quality resin is less than 2 hours. In alternate non-limiting embodiments, the cure time is less than 1 hour, e.g., less than 30 minutes. It is contemplated that there will be some covalent bonding at the abutting surfaces of the multifocal optical resin and the subjacent surface on which the multifocal optical resin is appended, e.g., a coating having a light influencing property, during curing of the multifocal resin. Such covalent bonding enhances the adhesion of the two layers, which can be further enhanced by incorporating adhesion-promoting additives in the optical resin and/or the coating having the light influencing property.

In one non-limiting embodiment of the present invention, the curable multifocal optical resin is substantially free of volatile materials, e.g., solvents (other than reactive solvents), so as to avoid the formation of volatile materials, e.g., vapors, during curing of that material. Volatile materials, such as solvents and dissolved gases, that vaporize during curing of the multifocal optical quality resin can cause manufacturing difficulties, and result in the presence of bubbles and/or other undesirable cosmetic imperfections in the multifocal layer.

In one non-limiting embodiment of the present invention, the curable multifocal optical quality resin has a relatively low degree of shrinkage during curing so as to avoid early separation of the casting and/or the preform from the multifocal mold, breakage of the multifocal mold and/or undesirable cosmetic imperfections in the multifocal layer. In alternate non-limiting embodiments, the degree of shrinkage of the curable multifocal optical quality resin is less than 15 percent, e.g., less than 10 percent.

Optical quality resins that provide cured polymerizates with the aforedescribed physical properties are well known to those skilled in the art or can be ascertained by routine experimentation within a chosen class of resins. Moreover, the refractive index of those cured resins are also well known. With such information, the skilled artisan can select from a variety of optical resins to provide the desired multifocal layer. Further, the skilled artisan can readily formulate the optical resin to possess a desired viscosity or flowability to allow the optical resin to be distributed evenly on the surface of the preform and/or the multifocal mold.

In accordance with a non-limiting embodiment of the present invention, the multifocal optical quality resin comprises dendritic polyester (meth)acrylate. Non-acrylated dendritic polyester-type macromolecules are described in U.S. Pat. Nos. 5,418,301, 5,663,247, 6,225,404 B1, and U.S. patent publication 2002/0151652 A1, among others. (See also, the text *Dendrimers and other Dendritic Polymers*. Jean M. J. Frechet and Donald A. Tomalia, Editors, ISBN: 0-471-63850-1.) These macromolecules are typically three-dimensional molecules having a treelike structure. As used herein, the terms "dendritic polyester-type macromolecules" and "dendritic polyester-type oligomers" (or terms of like import) are intended to mean and include hyperbranched dendritic macromolecules and dendrimers. Dendrimers are highly symmetric, while similar macromolecules designated as hyperbranched may to a certain degree hold an asymmetry, yet maintaining a highly branched treelike structure. Dendrimers can be said to be monodisperse or substantially monodisperse hyperbranched dendritic macromolecules.

Hyperbranched dendritic polyester macromolecules normally comprise an initiator or nucleus having one or more reactive sites or functions and a number of branching layers and optionally one or more spacing layers and/or a layer of chain terminating molecules. Continued replication of branching layers normally yields increased branch multiplicity and, where applicable or desired, increased number of terminal functions. The layers are usually called generations and the branches dendrons. Hyperbranched dendritic macromolecules (dendrimers) can be illustrated by the formulae found in column 6, lines 8 to 30 of U.S. Pat. No. 6,225,404 B1, which disclosure is incorporated herein by reference. In those formulae, X and Y are initiators or nuclei having four and two reactive functions, respectively, and A, B and C are branching chain extenders having three (A and C) and four (B) reactive functions, each branching chain extender forming one branching generation in the macromolecule. T in the aforementioned formulae is a terminating chain stopper or a suitable terminal function or site, such as hydroxyl, carboxyl or epoxide groups.

A dendron can be pre-produced and then added to a nucleus. A dendron can be produced by, for instance, condensing one or more hydroxy functional carboxylic acids at normal esterification temperatures, by allowing mono, di, tri or polyfunctional carboxylic acids to form ester links with mono, di, tri or polyfunctional alcohols or epoxides, or by similar procedures resulting in ester links, ether links or other chemical bonds. The raw materials used to produce a dendron are chosen to provide at least one terminal reactive site to be reacted with a nucleus or initiator.

Dendritic polyester-type macromolecules are generally built up from ester or polyester units optionally in combination with ether or polyether units. The hyperbranched dendritic macromolecule comprises a monomeric or polymeric nucleus having at least one reactive epoxide, hydroxyl, carboxyl or anhydride group, to which nucleus are added 1 to 100, usually 1 to 20, e.g., 2 to 8, branching generations comprising at least one monomeric or polymeric branching chain extender having at least three reactive groups, of which at least one is a hydroxyl group and at least one is a carboxyl or anhydride group, and optionally at least one spacing generation comprising at least one chain extender. The spacing chain extender is generally a compound having two reactive groups, one being the hydroxyl group and one being a carboxyl or anhydride group, or is an inner ether, such as a lactone, of such a compound. The terminal chain extender functions of the hyperbranched dendritic macromolecule are substantially hydroxyl, carboxyl or anhydride groups and the hyperbranched dendritic macromolecule is optionally completely or partly chain terminated by at least one monomeric or polymeric chain stopper and/or is functionalized.

Dendritic polyester-type macromolecules are well defined, highly branched macromolecules that radiate from a central core and, as discussed, are synthesized through a stepwise repetitive branching reaction sequence. The repetitive branching sequence typically guarantees complete shells for each generation, leading to macromolecules that are typically monodisperse. The synthetic procedures for dendritic polyester macromolecule preparation often provide nearly complete control over the size, shape, surface/interior chemistry, flexibility and topology. The dendritic polyester macromolecule can have complete and symmetrical branches as well as incomplete and asymmetric branches.

Non-limiting examples of central initiator molecules for polyester-type dendritic macromolecules include aliphatic, cycloaliphatic or aromatic diols, triols, tetraols, sorbitol, mannitol, dipentaerythritol, a reaction product of a di-, tri- or polyalcohol and an alkylene oxide, e.g., ethylene oxide, propylene oxide and butylene oxide, having a molecular weight less than 2000. Non-limiting examples of diols include 1,3-propanediol, a dimer, trimer or polymer of 1,3-propanediol, a 2-alkyl-1,3-propanediol, a 2,2-dialkyl-1,3-propanediol, such as 2-butyl-2-ethyl-1,3-propanediol, a 2-hydroxy-2-alkyl-1,3-propanediol, a 2,2-di(hydroxyalkyl)-1,3-propanediol, a 2-hydroxyalkoxy-2-alkyl-1,3-propanediol, a 2,2-di(hydroxyalkoxy)-1,3-propanediol, 1,2-propanediol, 1,3-butanediol, 1,2-ethanediol, 1,4-butanediol, 1,5-pentanediol, neopentyl glycol, trimethylolethane, trimethylolpropane, pentaerythritol, ditrimethylolethane, ditrimethylolpropane, 1,6-hexanediol and polytetrahydrofuran. The alkyl groups of the initiator molecules are generally $C_1$ to $C_{12}$, e.g., $C_1$ to $C_4$, alkyl groups.

Polyester chain extenders are generally monofunctional carboxylic acids having at least two hydroxy groups such as, but not limited to, dimethylolpropionic acid, α,α-bis(hydroxy) propionic acid, α,α-bis(hydroxymethyl) propionic acid, α,α-bis(hydroxymethyl) butyric acid, α,α-bis(hydroxymethyl) valeric acid, α,α,α-tris(hydroxymethyl) acetic acid, α,α-bis(hydroxymethyl) butyric acid, α,β-dihydroxy propionic acid, heptonic acid, citric acid, d- or l-tartaric acid or α-phenylcarboxylic acids, such as 3,5-dihydroxybenzoic acid.

Chain terminating agents that can be used, include but are not limited to saturated monofunctional carboxylic acids, saturated fatty acids, unsaturated monofunctional carboxylic acids, aromatic monofunctional carboxylic acids, such as benzoic acid, and difunctional or polyfunctional carboxylic acids or anhydrides thereof. A non-limiting example of such an acid is behenic acid. Terminal hydroxyl groups in the polyester chain extender can be reacted with chain stoppers with or without functional groups.

Dendritic polyester-type macromolecules are commercially available from Perstorp Specialty Chemicals, Perstorp, Sweden under the designation BOLTORN® H20, H30, and H40 dendritic macromolecules, which macromolecules are functionalized with hydroxy groups at the periphery. These materials have a weight average molecular weight in the range of 1,000 to 4000. The BOLTORN® H20, H30 and H40 materials have on average 16, 32 and 64 hydroxy groups respectively at the periphery of the macromolecule.

Dendritic polyester macromolecule materials can be acrylated by known esterification techniques to provide material used to form the dendritic polyester acrylate resin of optical quality used to prepare the transparent multifocal layer described in this specification. See, for example, the disclosures in International Patent Publications WO 00/77070 A2 and WO 00/64975.

Acrylation of the dendritic polyester macromolecule, and recovery and purification of the acrylated dendritic polyester macromolecule may be performed using methods well known from the literature, as for instance the- methods described in the article "Acrylic Ester Polymers" which is found in the Kirk-Othmer Encyclopedia of Chemical Technology (1980 Vol. 1, pages 386-413). Acrylation is generally a direct reaction, such as esterification, by the molecule to be acrylated with, for example, acrylic acid, methacrylic acid, or crotonic acid (β-methacrylic acid), condensation with an isocyanato (meth)acrylate, or a direct reaction with an anhydride and/or a halide corresponding to said acrylic acid, usually at a molar ratio of hydroxyl groups to said acid, anhydride and/or halide of between 1:0.1 and 1:5, more usually between 1:0.5 and 1:1.5. Other non-limiting examples of acrylating agent include epoxide or anhydride functional acrylates and methacrylates, such as glycidylmethacrylate. In a non-limiting embodiment, the acrylating agent is used in stoichiometric molar excess.

The percent of functional acrylic acid groups, e.g., hydroxyl groups that have been acrylated, in acrylated dendritic polyester macromolecules can vary, but generally will range from 5 to 100%, based on the initial hydroxyl content. In alternate non-limiting embodiments, the percent of functional acrylic acid groups in the acrylated dendritic polyester macromolecule may vary from 20 to 90%, e.g., 40 to 85%, such as from 45 to 80%. The percentage of acrylated hydroxyl groups can range between any combination of these percentages, inclusive of the recited percentages.

The esterification step is typically performed in the presence of a solvent, such as an apolar organic solvent. Non-limiting examples of such solvents include, but are not limited to, heptane, cyclohexane, toluene, benzene, xylene or mixtures of such solvents. The esterification is generally performed in the presence of a catalyst, such as p-toluene sulfonic acid, methane sulfonic acid, trifluoromethane sulfonic acid, trifluoroacetic acid, sulfuric acid, phosphoric acid, naphthalene sulfonic acid, Lewis acids such as $BF_3$, $AlCl_3$, $SnCl_4$, titanates such as tetrabutyl titanates, and organotin compounds.

The acrylation step generally is performed at temperatures of from 50 to 200° C., e.g., from 80 to 150° C. Acrylation temperatures can vary and generally depend upon the selected solvent and the pressure at which the acrylation step is performed. In one non-limiting embodiment, the acrylation step is performed in the presence of a radical polymerization inhibitor, such as methyl ether hydroquinone, hydroquinone, phenothiazine, di-t-butyl hydroquinone, or a mixture of such inhibitors.

In accordance with the disclosure of International Patent Publication WO 00/64975, the dendritic polyester macromolecule can be mixed with an organic alcohol, e.g., an aliphatic alcohol, having one or more hydroxyl groups and a molecular weight of less than 2000, e.g., 60 to 1500 or 100 to 1000, prior to the acrylation step because dendritic polyester macromolecules are generally viscous liquids. Generally, the alcohol is a liquid at temperatures of from 20 to 50° C. or yields liquid mixtures with said dendritic polyester macromolecule at said temperature. The alcohol can be a diol. Non-limiting examples of diols include ethylene glycol, a 1,2- or 1,3-propylene glycol, a butanediol or a di-, tri- or polyglycol, as for example a diethylene glycol, a polypropylene glycol or a glycol polymer, such as a polymer comprising one or more ethylene glycols and one or more propylene glycols. The weight ratio of the dendritic polyester macromolecule and alcohol can vary. In one non-limiting embodiment, the weight ratio of the dendritic polyester to alcohol may vary between 90:10 and 10:90 In alternate non-limiting embodiments, the weight ratio of the dendritic polyester to alcohol may vary between 25:75 and 75:25, such as between 40:60 and 60:40, e.g., 50:50. The weight ratio of the dendritic polyester macromolecule and alcohol can vary between any combination of the recited values, inclusive of the specified values. Acrylation of the mixture of dendritic polyester and alcohol produces a composition comprising at least one dendritic polyester acrylate and at least one acrylate monomer.

As used in the present disclosure and claims, the term "dendritic polyester acrylate" (or a term of like import) means the composition produced by acrylating a dendritic polyester-type macromolecule or by acrylating a dendritic polyester-type macromolecule containing a viscosity reducing material having a group that is acrylated during the acrylation step, e.g., one or more alcohols having one or more hydroxyl groups. The term "dendritic polyester acrylate layer" (or a term of like import) means the layer produced by curing, e.g., by radiation and/or thermal methods, of a composition comprising a dendritic polyester acrylate (as defined above) or a composition comprising a dendritic polyester acrylate (as defined above) and at least one other radiation or thermally curable material (hereinafter referred to as radiation curable material), e.g., a composition of a mixture of dendritic polyester acrylate (as defined above) and radiation or thermally curable acrylic monomer (s), e.g., (meth)acrylic monomer materials. It is also contemplated that a blend of different dendritic polyester acrylates can be used in the compositions used to prepare the dendritic polyester acrylate layer. The term "composition comprising dendritic polyester acrylate" (or terms of like import) means any of the aforementioned compositions.

Non-limiting examples of radiation curable acrylic monomer material(s) that can be used in the composition comprising dendritic polyester acrylate include monoacrylates, and polyacrylates such as diacrylates, triacrylates, tetraacrylates, pentaacrylates, etc. Monoacrylates, e.g., a monomer containing a single acrylic functionality, include but are not limited to hydroxy-substituted monoacrylates and alkoxysilyl alkyl acrylates, such as trialkoxysilylpropylmethacrylate. In a non-limiting embodiment, the radiation curable monomer materials are chosen from diacrylates, triacrylates and mixtures of such polyacrylates. Examples of acrylic monomers include, but are not limited to, the acrylic monomers described subsequently herein in connection with the radiation-curable, acrylate-based polymerizable composition that can be used as the multifocal optical quality resin. See, also, pages 15-19 of copending U.S. patent application of Eric M. King, Ser. No. 10/793,589, filed Mar. 4, 2004 for further non-limiting examples of acrylic monomers.

The weight ratio of radiation curable acrylic monomer material(s) to dendritic polyester acrylate in the composition comprising dendritic polyester acrylate can vary and will depend generally on the physical properties of the curable mixture and the resultant multifocal layer that are desired, e.g., viscosity of the mixture, the degree of crosslinking, and hardness of the multifocal layer. In a non-limiting embodiment, the weight ratio of dendritic polyester acrylate(s) to the radiation curable acrylic monomer material(s) can range from 90:10 to 10:90. In alternate non-limiting embodiments, the weight ratio can range from 70:30 to 30:70, e.g., from 40:60 to 60:40, such as 50:50. The weight ratio of the dendritic polyester acrylate to the additional acrylate monomer material can vary between any combination of the recited values, inclusive of the specified values.

The aforedescribed amounts of additional acrylate monomers, and other reactive monomers/diluents are based on the total quantity of polymerizable materials (resin solids) comprising the curable dendritic polyester acrylate composition, not including other components, such as photoinitiators. The total of all of the various polymerizable materials comprising the curable dendritic polyester acrylate composition will, of course, equal 100 percent.

Radiation curable acrylic materials are typically commercially available; and, if not commercially available, can be prepared by procedures well known to those skilled in the art. Examples of commercial acrylate materials can be found in U.S. Patent No. 5,910,375, particularly in the disclosure found in column 8, lines 20-55, and in column 10, lines 5 -36, which disclosures are incorporated herein by reference. Commercially available acrylate materials are available from various manufacturers and include those sold under the trade names, SARTOMER, EBECRYL, and PHOTOMER.

In a non-limiting embodiment, the dendritic polyester acrylate and compositions comprising such acrylate(s) can contain additives to enhance the efficacy of the multifocal layer or to enhance its application to the preform and its removal from the multifocal mold. Such materials include, but are not limited to, art-recognized adhesion promoting additives, ultraviolet light stabilizers, hindered amine stabilizers, mold release agents, viscosity, flow and leveling additives, etc. A discussion of adhesion promoters and other additives can be found on pages 21-24, and 25-26 of the previously cited U.S. patent application of Eric M. King, Ser. No. 10/793,589.

Dendritic polyester acrylates and compositions comprising dendritic polyester acrylate(s) may be cured with or without the use of photoinitiators. While these materials can be cured without photoinitiators, the use of small amounts of one or more photoinitiators will enhance the cure rate and provide a more complete cure in a shorter amount of time.

When used, the photoinitiator is present in amounts sufficient to initiate and sustain the curing of the composition, e.g., an initiating or photoinitiating amount. Photoinitiators are desirably used in the least amount necessary to obtain initiation of the curing process. Generally, the photoinitiator(s) is present in amounts of from 0.1 to 10 weight percent, such as from 0.2 to 1 weight percent, more generally from 0.3 to 0.5 weight percent, based on the total weight of the photoinitiated polymerizable components in the curable dendritic polyester acrylate film composition. Photoinitiators are well known to those skilled in the art. Non-limiting examples of commercially available photoinitiators can be found in column 10, lines 38-43 of U.S. Pat. No. 5,910,375, and in column 11, lines 24-65 of U.S. Pat. No. 6,271,339 B1, which disclosures are incorporated herein by reference.

In accordance with a non-limiting embodiment of the present invention, the multifocal optical quality resin can be a composition comprising at least one maleimide derivative, e.g., a radiation-cured maleimide derivative, such as a maleimide oligomer, e.g., a bismaleimide oligomer. Maleimide derivatives such as maleimide oligomers are known in the art. See, for example, U.S. Pat. Nos. 5,446,073; 6,034, 150; 6,306,923 B1; 6,369,124 B1; 6,410,611 B1; and U.S. Patent Publication 2003/0073755 A1; EP Patent Publication 0 878,482 A1; and International Patent Publications WO 99/03930 and WO 01/68602.

Maleimide derivatives that can be used as the multifocal optical quality resin can be represented by the following general formula (1):

M-R-FG    (1)

wherein:

(a) M is the maleimido group, i.e.,

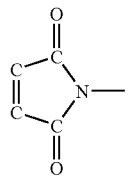

(b) R is a linear or branched $C_1$ to $C_{10}$ alkyl; and (c1) FG is a functional group chosen from —$OR_3$, —OC(O)$N(R_3)_2$, OC(O)C(=$CHR_3$)$R_3$, —OC(O)$R_3$, —C(O)$R_3$, —$N(R_3)_2$, —C(O)$OR_3$, —NCO, —C(O)$N(R_3)_2$, or —OC(O)$OR_3$, provided that when FG is —$OR_3$, R is $C_1$ to $C_4$ linear or branched alkyl; each $R_3$ being chosen from hydrogen, alkyl, aryl, cycloalkyl, arylalkyl or alkylaryl groups of less than 20 carbon atoms, e.g., from 1 to 10 carbon atoms; or (c2) FG is a functional group, as defined in (c1) in combination with a spacer group linking said maleimido group with at least one other maleimido group to form a polymaleimido compound, such as a di-, tri-, tetra- or other polymaleimido compound.

The maleimide derivative can be depicted also by the general representations:

M-[oligomer]-M    (2), and $M_x$[oligomer]    (2A)

wherein M is as defined above in formula (1), x is a number of from 2 to 4, and [oligomer] represents the structure linking the maleimido groups.

In one non-limiting embodiment, the maleimide derivative can be represented by the following general formula (3):

M-$R_4$-$G_1$-$R_6$-$G_2$-$R_5$-M    (3)

wherein M is as defined in formula (1), $R_4$ and $R_5$ represent linking groups, which may be the same or different, and are each independently chosen from bivalent alkylene, alicyclic, arylalkylene, or cycloalkyalkylene groups of less than 20 carbon atoms, $G_1$ and $G_2$ each represent an ester linkage represented by —C(O)O— or —OC(O)—, or the group —OC(O)N— (carbamate), and $R_6$ represents a bivalent linking group chosen from alkylene groups (linear or branched) of from 1 to 24 carbon atoms, an alkylene group of from 1 to 24 carbon atoms comprising a hydroxy functionality, a cycloalkylene (alicyclic) group of from 4 to 7 carbon atoms, a dicycloalkylene alkyl group of from 11 to 24 carbon atoms, an arylene group of from 6 to 10 carbon atoms, an arylalkylene group of from 6 to 24 carbon atoms, a diarylene alkyl group of from 13 to 24 carbon atoms, a polyether group, or a polyester group. In a non-limiting embodiment, the polyether and polyester groups can have average molecular weights of from 100 to 5,000.

Non-limiting examples of the groups depicted in formula (3), as well as examples of maleimide derivatives and methods for preparing such derivatives, can be found at column 4, line 26 through column 12, line 24 of U.S. Pat. No. 6,410,611 B1, which disclosure is incorporated by reference. Examples of $R_4$ and $R_5$ include, but are not limited to, straight and branched chain alkylene groups, such as $C_1$ to $C_{12}$ alkylene groups, e.g., methylene, ethylene, trimethylene, tetramethylene, pentamethylene, hexamethylene, 1-methylethylene, 1-methyl-trimethylene, 2-methyl-trimethylene, 1-methyl-tetramethylene, and the like; cycloalkylene groups such as the cyclopentylene and cyclohexylene groups; arylalkylene groups having an aryl group at a main chain or a side chain, such as the benylene, 2,2-diphenyl-trimethylene, 1-phenyl-ethylene, 1-phenyl-tetraethylene, 2-phenyl-tetraethylene groups, and the like; cycloalkyl alkylene groups having an alicyclic groups at a main chain or a side chain, such as cyclohexyl-methylene, 1-cyclohexyl-ethylene, 1-cyclohexyl-tetraethylene, 2-cyclohexyl-tetraethylene groups, and the like.

Non-limiting examples of the linking chain represented by $R_6$ include:

(a) a polyether polyol residue group having an average molecular weight of 100 to 5,000, and comprising a part in which at least one group chosen from a straight chain alkylene group having 1 to 24 carbon atoms, a branched alkylene group having from 2 to 24 carbon atoms, an alicyclic group having from 3 to 24 carbon atoms, or an aryl group having from 6 to 24 carbon atoms is connected with an ether linking chain or a repeating unit thereof;

(b) a polyester polyol residue group having an average molecular weight of 100 to 5,000 and comprising a part in which at least one group chosen from a straight chain alkylene group having from 2 to 24 carbon atoms, a branched alkylene group having from 2 to 24 carbon atoms, an alicyclic group having from 3 to 24 carbon atoms, or an aryl group having from 6 to 24 carbon atoms is connected with an ester linking chain or a repeating unit thereof, (c) a polycarboxylate polyether polyol ester having a polycarboxylic acid residue group at a terminal position obtained by esterification of polyether polyol with a carboxylic acid having 2 to 6 carbon atoms, which have an average molecular weight of 100 to 5,000, and comprising a part in which at least one group chosen from a straight chain alkylene group having from 1 to 24 carbon atoms, a branched alkylene group having from 2 to 24 carbon atoms, an alicyclic group having from 3 to 24 carbon atoms, or an aryl group having from 6 to 24 carbon atoms is connected with an ester linking chain or a repeating unit thereof;

(d) a polycarboxylate polyester polyol ester having a polycarboxylic acid residue group at a terminal position obtained by esterification of polyester polyol with a carboxylic acid having from 2 to 6 carbon atoms, which have an average molecular weight of 100 to 5,000, e.g., 100 to 2000, and comprising a part in which at least one group chosen from a straight chain alkylene group having from 1 to 24 carbon atoms, a branched alkylene group having from 2 to 24 carbon atoms, an alicyclic group having from 3 to 24 carbon atoms, or an aryl group having from 6 to 24 carbon atoms is connected with an ether and an ester linking chain or a repeating unit thereof, and (e) a linking chain obtained by ring opening a polyepoxide having an average molecular weight of from 100 to 5,000, and comprising a part in which at least one group chosen from a straight chain alkylene group having from 1 to 24 carbon atoms, a branched alkylene group having from 2 to 24 carbon atoms, an alicyclic group having from 3 to 24 carbon atoms, or an aryl group having from 6 to 24 carbon atoms is connected with an ether linking chain, or a repeating unit comprising the parts, and the like.

Non-limiting examples of maleimide derivatives include: N-methylmaleimide, N-ethylmaleimide, N-propylmaleimide, N-n-butylmaleimide, N-tert-butylmaleimide, N-pentylmaleimide, N-hexylmaleimide, N-laurylmaleimide, 2-maleimide ethyl ethylcarbonate, 2-maleimide ethyl isopropylcarbonate, N-ethyl-(2-maleimide ethyl) carbamate; N-cyclohexylmaleimide; N-phenylmaleimide, N-2-methyl phenylmaleimide, N-2-ethyl phenylmaleimide, N-(2,6-diethylphenyl) maleimide, N-2-chlorophenylmaleimide, and N-(4-hydroxyphenyl)maleimide, N,N'-methylene bismaleimide, N,N'-ethylene bismaleimide, N,N'-trimethylene bismaleimide, N,N'-hexamethylene bismaleimide, N,N'-dodecamethylene bismaleimide, polypropylene glycol-bis (3-maleimidepropyl)ether, tetraethylene glycol bis(3-maleimidepropyl)ether, and bis(2-maleimidethyl)carbonate; 1,4-dimaleimide cyclohexane and isophorone bisurethane bis(N-ethylmaleimide); N,N'-(4,4'-diphenylmethane)bismaleimide, N,N'-(4,4'-diphenyloxy)bismaleimide, N,N'-p-phenylene bismaleimide, N,N'-m-phenylenebismaleimide, N,N'-2,4-tolylene bismaleimide, N,N'-2,6-tolylene bismaleimide, N,N'-[4,4'-bis(3,5-dimethylphenyl)methane]bismaleimide, N,N'-[4,4'-bis(3,5-diethylphenyl)methane]bismaleimide, 2-ethylcarbonate ethylmaleimide, 2-isopropyl urethane ethylmaleimide, 2-acryloyl ethylmaleimide, acetoxy ethylmaleimide, isophorone bisurethane bisethylmaleimide, triethyleneglycol biscarbonate bisethylmaleimide, bisethylmaleimide carbonate, 4,9-dioxa-1,12-dodecane bismaleimide, and maleimide derivatives obtained by urethanation reactions of hydroxymaleimides, such as hydroxy ethylmaleimide with polyisocyanates (di-, tri-, etc isocyanates).

As used in the present disclosure and claims, the terms "maleimide derivative", "maleimide oligomer", "radiation-curable maleimide derivative", or similar terms, mean the materials represented by formulae (1), (2), (2A) or (3).

The maleimide derivative material may be blended with other radiation and/or thermally-curable materials, e.g., monomeric materials having unsaturated double bonds in their structure. Such compounds can include, but are not limited to, maleimide derivatives that are not. represented by formulae (1), (2), (2)A or (3), monomers and oligomers derived from such materials as acrylic acid and methacrylic acid derivatives, e.g., (meth)acryloyl derivatives, (meth) acrylamide derivatives, vinyl-containing derivatives, e.g., vinyl ether, vinyl ester and vinyl carboxylate derivatives, styrene derivatives and unsaturated polyester derivatives.

The term "composition comprising a maleimide derivative" means compositions containing only maleimide derivatives, and compositions comprising maleimide derivatives and at least one other radiation or thermally curable unsaturated monomeric material (hereinafter referred to collectively as radiation-curable material).

The other radiation-curable unsaturated monomer material(s) can be blended with the maleimide derivative material (s) in various ratios, which will depend on the physical properties of blend and of the multifocal layer that are desired, e.g., viscosity of the blend, the degree of crosslinking, and hardness of the multifocal layer. Generally, the weight ratio of the maleimide derivative material(s) to the other curable unsaturated monomer material(s) can vary widely. In a non-limiting embodiment, the weight ratio can range from 90:10 to 10:90. In alternate non-limiting embodiments, the weight ratio can range from 70:30 to 30:70, e.g., from 40:60 to 60:40, such as 50:50. The ratio of the maleimide derivative-containing material to the other curable unsaturated monomer material can vary between any combination of the recited values inclusive of the specified values.

Radiation curable (meth)acrylic monomer material(s) that can be incorporated into the composition comprising a maleimide derivative include monoacrylates, and polyacrylates, such as diacrylates, triacrylates, tetraacrylates, pentaacrylates, etc. Generally, diacrylates, triacrylates and mixtures of such acrylates are used. Non-limiting examples of acrylic monomers include, but are not limited to, the acrylic monomers described subsequently herein in connection with the radiation-curable, acrylate-based polymerizable composition that can be used as the multifocal optical quality resin. For a further discussion of (meth)acrylic monomer material (s) and other materials, e.g., compounds having vinyl ether groups, that can be used in conjunction with the maleimide derivative, see pages 16-22 of U.S. patent application Ser. No. 10/793,588 filed on Mar. 4, 2004 in the name of Eric M. King for Photochromic Optical Article.

Compounds having vinyl ether groups that can be used in the radiation-curable maleimide derivative-containing composition include, but are not limited to, monovinyl ethers, divinyl ethers and polyvinyl ethers in which a vinyl ether group is connected with an alkylene group; and in which a vinyl ether group is connected with at least one group with and without substituents selected from alkyl, cycloalkyl and aromatic groups, via at least one linkage selected from an ether linkage, a urethane linkage and an ester linkage. In a non-limiting embodiment, there can be mentioned alkyl vinyl ethers having a terminal group substituted with hydrogen, halogen, hydroxyl and amino atoms/groups, generally having a chain length of from 1 to 22 carbon atoms; divinyl ethers, such as divinyl ethers of polyols having, for example, 2 to 6 hydroxyl groups, including ethylene glycol, propylene glycol, butylene glycol, 3-methyl propane triol and pentaerythritol; and a cycloalkyl vinyl ether having a terminal group substituted with hydrogen, halogen, hydroxyl and amino atoms/groups;

Examples of such compounds include, but are not limited to, methyl vinyl ether, hydroxymethyl vinyl ether, chloromethyl vinyl ether, ethyl vinyl ether, 2-hydroxyethyl vinyl ether, 2-chloroethyl vinyl ether, diethyl aminoethyl vinyl ether, propyl vinyl ether, 3-hydroxypropyl vinyl ether, 2-hydroxypropyl vinyl ether, 3-chloropropyl vinyl ether, 3-aminopropyl vinyl ether, isopropyl vinyl ether, butyl vinyl ether, 4-hydroxybutyl vinyl ether, isobutyl vinyl ether, 4-aminobutyl vinyl ether, methylene glycol divinyl ether, ethylene glycol divinyl ether, propylene glycol divinyl ether, 1,4-butanediol divinyl ether, 1,6-hexanediol divinyl ether, cyclohexanediol divinyl ether, trimethylolpropane trivinyl ether, and pentaerythritol tetravinyl ether.

Other non-limiting examples of vinyl ethers that can be used include ethylene glycol methyl vinyl ether, diethylene glycol monovinyl ether, diethylene glycol methylvinyl ether, diethylene glycol divinyl ether, triethylene glycol monovinyl ether, etc. See, for example, the vinyl ethers specified in column 19, line 26 through column 20, line 27 of U.S. Pat. No. 6,410,611 B1, which disclosure is incorporated by reference.

Other unsaturated monomeric materials that can be included in the curable maleimide derivative-containing composition include, but are not limited to, aminoplast acrylates, i.e., melamine acrylate, vinyl acetate, vinyl and vinylidene halides and amides, i.e., methacrylamide, acrylamide, diacetone acrylamide, vinyl and vinylidene esters, vinyl and vinylidene ethers, vinyl and vinylidene ketones, butadiene, vinyl aromatics, i.e., styrene, alkyl styrenes, halostyrenes, alkoxystyrenes, divinyl benzenes, vinyl toluene, and the like, as well as prepolymers such as acrylated epoxides, polyesters and polyurethanes.

The composition comprising the maleimide derivative may also contain additives, such as adhesion promoters, light sensitizers, light stabilizers, etc. A description of such additives and their purpose can be found in the previous discussion of such additives in connection with the dendritic polyester acrylate optical quality resin. That disclosure is applicable here as well.

The composition comprising the maleimide derivative can be cured with or without a photoinitiator. When used the photoinitiator is present in amounts sufficient to initiate and sustain the curing of the composition, e.g., an initiating or photoinitiating amount. A description of photoinitiators and photoinitiating amounts can be found in the previous discussion of such materials in connection with the disclosure of the dendritic polyester acrylate optical quality resin. That description is also applicable here.

In another non-limiting embodiment of the present invention, the curable multifocal optical quality resin is a thermally curable polymerizable composition comprising a liquid crosslinkable composition of a polyepoxide and a polyacid curing agent, which curing agent can comprise a half-ester formed from reacting an acid anhydride with a polyol.

Clear film-forming compositions comprising a polyepoxide and polyacid curing agent are known in the art. Such compositions that have been adapted to possess the appropriate viscosity and the desired polymerizate clarity can be used to prepare the optical quality multifocal layer. Non-limiting examples of polyepoxides that are described in the art include epoxy condensation polymers and certain polyepoxide monomers and oligomers.

Non-limiting examples of such epoxy condensation polymers include polyepoxides having a 1,2-epoxy equivalency greater than 1, desirably greater than 1 and up to 3.0, such as polyglycidyl ethers of aliphatic alcohols. These polyepoxides can be produced by etherification of the aliphatic alcohol with an epihalohydrin, such as epichlorohydrin, in the presence of alkali. Non-limiting examples of aliphatic alcohols include ethylene glycol, diethylene glycol, 1,2-propylene glycol and 1,4-butylene glycol. Also, cycloaliphatic polyols, such as 1,2-cyclohexanediol, 1,4-cyclohexanediol, 1,2-bis(hydroxymethyl)cyclohexane and hydrogenated Bisphenol A, can also be used.

In addition to the epoxy-containing polymers described above, certain polyepoxide monomers and oligomers can also be used. Non-limiting examples of these materials are described in U.S. Pat. No. 4,102,942 in column 3, lines 1-16, which disclosure is incorporated herein by reference. Examples of such polyepoxides include, but are not limited to, 3,4-epoxycyclohexylmethyl-3,4-epoxycyclohexanecarboxylate and bis(3,4-epoxy-6-methylcyclohexylmethyl) adipate.

The polyacid curing agent contains two or more acid groups per molecule that are reactive with the polyepoxide to form a crosslinked coating as indicated by its resistance to organic solvent. The acid functionality is typically carboxylic acid, although acids such as sulfonic acid can be used. Generally, the polyacid curing agent is a carboxyl-terminated material having at least two carboxyl groups per molecule. Non-limiting examples of polyacid curing agents that can be used are carboxylic acid group-containing polymers, polyesters, and polyurethanes, and oligomers, such as ester group-containing oligomers and monomers.

Various polycarboxylic acids can be used as the curing agent, including but not limited to dicarboxylic acids such as phthalic acid, tetrahydrophthalic acid, hexahydrophthalic acid, maleic acid, itaconic acid, adipic acid, sebacic acid and the like. Also anhydrides of the polycarboxylic acids where they exist can be used.

The polyacid curing agent is present in the composition in amounts of from 10 to 90, generally 25 to 75, percent by weight based on the total weight of resin solids. The polyepoxide-polyacid composition also can contain an anhydride, e.g., an anhydride that is a liquid at 25° C. The presence of such an anhydride in the compositions provides an improved cure response. Non-limiting examples of anhydrides include alkyl-substituted hexahydrophthalic anhydrides wherein the alkyl group contains up to 7 carbons, e.g., up to 4 carbons, such as methyl hexahydrophthalic anhydride and dodecenyl succinic anhydride. The amount of the anhydride that is used can vary. In one non-limiting embodiment, the amount of the anhydride used ranges from 0 to 40, e.g., from 5 to 25, percent by weight, based on total weight of resin solids. The equivalent ratio of carboxyl to epoxy groups in the multifocal layer-forming compositions is generally adjusted so that there are about 0.3 to 3.0, usually from 0.8 to 1.5, equivalents of carboxyl (anhydride being considered monofunctional) per equivalent of epoxy.

The polymerizable composition will also generally contain catalysts to accelerate the cure of the epoxy and acid groups. Non-limiting examples of such catalysts are basic materials and include organic amines and quaternary ammonium compounds such as pyridine, piperidine, dimethylaniline, diethylenetriamine, tetramethylammonium chloride, tetramethylammonium acetate, tetramethylbenzylammonium acetate, tetrabutylammonium fluoride, and tetrabutylammonium bromide. The amount of catalyst used can vary. In a non-limiting embodiment, the amount of catalyst used ranges from 0 to 10, e.g., from 0.5 to 3, percent by weight based on resin solids.

The multifocal transparent polyepoxide-polyacid resin layer can be thermally cured. In the curing operation, the polyepoxide-polyacid composition is crosslinked with the aid of any crosslinking agents present. In a non-limiting embodiment, the heating or curing operation is carried out at temperatures in the range of from 160° F.-350° F. (71° C.-177° C.) If required, lower or higher temperatures may be used depending upon whether it is sufficient to activate any necessary crosslinking mechanisms.

In another non-limiting embodiment of the present invention, thermosetting polyurethane compositions can be used to prepare the multifocal optical quality resin layer that is applied to the preform. These polyurethane compositions are based on a polymeric polyol and an organic polyisocyanate, including blocked polyisocyanates. Generally, the polymeric polyol is chosen from those polyols that have a low viscosity at room temperature. Non-limiting examples of polymeric polyols are polyether polyols, polyester polyols; polycarbonate polyols, and mixtures of such polyols. Non-limiting examples of organic polyisocyanates are monomeric polyisocyanates and polymeric isocyanates. Generally, polymeric polyisocyanates are used because they are less likely to leave extractable low molecular weight materials in the polyurethane.

Polyester polyols are prepared by the polyesterification of an organic polycarboxylic acid or anhydride thereof with organic polyols and/or an epoxide. Generally, the polycarboxylic acids and polyols are aliphatic or aromatic dibasic acids and diols. Polyols of higher functionality, e.g., trimethylolpropane and pentaerythritol, may also be used. Besides polyester polyols formed from polybasic acids and polyols, polylactone-type polyesters can also be employed. Such products are described in U.S. Pat. No. 3,169,945. In addition to the polyester polyols, hydroxy-containing acrylic polymers or acrylic polyols may be used as the polyol component.

Non-limiting examples of polyether polyols are polyalkylene ether polyols, which include those having the following general formula:

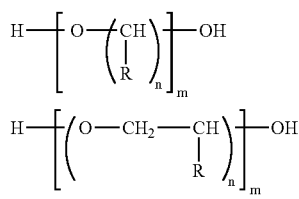

wherein the substituent R is hydrogen or lower alkyl containing from 1 to 5 carbon atoms, including mixed substituents, n is generally a number of from 2 to 6 and m is a number of from 10 to 100 or more.

Polyisocyanates that can be used include aromatic and aliphatic polyisocyanates. Generally, aliphatic polyisocyanates are used because of their superior ultraviolet light stability and non-yellowing tendencies. Non-limiting examples of such polyisocyanates include monomeric polyisocyanates, such as toluene diisocyanate, and 4,4'-methylene-bis-(cyclohexyl isocyanate), and isophorone diisocyanate. Other non-limiting examples are the isocyanurates from isophorone diisocyanate and 1,6-hexamethylene diisocyanate, both of which are commercially available.

For low temperature curing of thermosetting polyurethane compositions, a catalyst such as a tin compound, e.g., dibutyltin dilaurate, is generally present in the thermosetting polyurethane composition. The amount of catalyst used can vary. Generally, the amount of catalyst used is in amounts of 0.25 to 0.30 percent by weight, based on weight of resin solids. The conditions adopted for curing the thermosetting polyurethane coating can vary. Generally, thermosetting polyurethane compositions are cured at a temperature of from 20° to 140° C. for from 30 seconds to 4 hours. Lower cure temperatures will require longer cure times. Infrared heating can be used to shorten the cure time until the coating can be handled.

In a further non-limiting embodiment of the present invention, the multifocal optical quality resin can comprise radiation-curable acrylates, e.g., a radiation-curable, acrylate-based polymerizable composition, that when cured provides a transparent layer. Specific details of acrylate components that can be used to prepare the multifocal optical quality resin can be found on page 26, line 11 through page 34, line 1 of International patent publication, WO 03/058300 A1, which disclosure is incorporated by reference.

For example, the radiation-curable acrylate-based composition can be prepared using acrylic or methacrylic monomers or mixtures of acrylic and/or methacrylic monomers. The mixture of (meth)acrylic monomers can include mono-, di-, tri-, tetra-, and penta- acrylic functional monomers. Additional co-polymerizable monomers, such as epoxy monomers, e.g., monomers containing an epoxy functionality, monomers containing both acrylic and epoxy functionalities, etc., may also be present in the formulation. The monomers used to prepare the acrylate-based composition are comprised of a plurality, e.g., a major amount, i.e., more than 50 weight percent, of acrylic-functional monomers. The acrylate-based composition can also contain components having at least one isocyanate functionality, e.g., blocked and unblocked organic monoisocyanates and organic diisocyanates, thereby to incorporate polyurethane groups within the multifocal layer.

Non-limiting examples of acrylate monomers include polyfunctional acrylates, e.g., di-, tri-, tetra-, and pentafunctional acrylates, and monofunctional acrylates, e.g., a monomer containing a single acrylic functionality, hydroxy-substituted monoacrylates and alkoxysilyl alkylacrylates, such as trialkoxysilylpropylmethacrylate. Other reactive monomers/diluents, such as monomers containing an ethylenic functional group (other than the acrylic-functional materials) can also be present.

Many acrylates can be represented by the following general formula I,

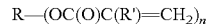

wherein R is an aliphatic or aromatic group containing from 2 to 20 carbon atoms and optionally from 1 to 20 alkyleneoxy linkages; R' is hydrogen or an alkyl group containing from 1 to 4 carbon atoms, and n is an integer of 1 to 5. When n is greater than 1, R is a linking group that links the acrylic functional groups together. Generally, R' is hydrogen or methyl, and n is an integer of from 1 to 3. More specifically, diacrylates (when n is 2) can be represented by general formula II,

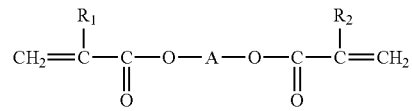

wherein $R_1$ and $R_2$ can be the same or different and are each chosen from hydrogen or alkyl groups containing from 1 to 4 carbon atoms, e.g., methyl, and A is a hydrocarbyl linking group of, for example, from 1 to 20 carbon atoms, e.g., an alkylene group, one or more oxyalkylene group(s) [or mixture of different oxyalkylene groups]; or a group of the following general formula III,

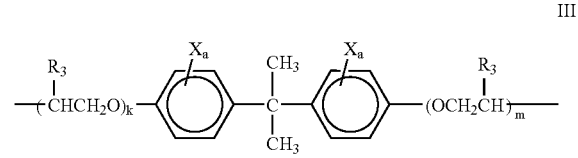

wherein each $R_3$ is a hydrogen atom or an alkyl group of from 1 to 4 carbon atoms, e.g., methyl; X is a halogen atom, e.g., chlorine; a is an integer of from 0 to 4, e.g., 0 to 1, representing the number of halogen atoms substituted on the benzene ring; and k and m are generally numbers of from 0 to 20, e.g., 1 to 15, or 2 to 10. The values of k and m are average numbers and when calculated can be a whole number or a fractional number.

Acrylates having an epoxy group can be represented by the following general formula IV,

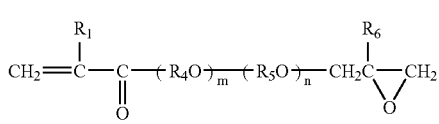

wherein $R_1$ and $R_6$ may be the same or different and are each selected from hydrogen or an alkyl group of from 1 to 4 carbon atoms, e.g., methyl; $R_4$ and $R_5$ are alkylene groups containing from 2 to 3 carbon atoms, e.g., ethyleneoxy and propyleneoxy, and m and n are generally numbers of from 0 to 20, e.g., 0 or 1 to 15 or 2 to 10. When one of m and n is 0 and the other is 1, the remaining R group can be an aromatic group of the following formula V,

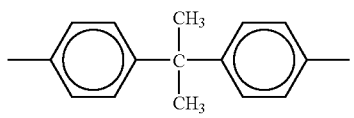

e.g., a group derived from the 2,2'-diphenylenepropane radical, which phenyl groups may be substituted with $C_1$ to $C_4$ alkyl groups or halogens, e.g., methyl and/or chlorine.

Radiation curing of acrylate-based polymeric systems generally utilize ultraviolet light (UV) as the source of energy to effect curing. UV curing requires the presence of at least one photoinitiator. A description of photoinitiators and their amounts has been discussed in connection with the multifocal dendritic polyester acrylate optical quality resin. That description is also applicable here.

In one non-limiting embodiment, acrylate-based formulations may comprise those wherein acrylate material(s) comprise from 0 to 100 weight percent of the formulation. In alternate non-limiting embodiments, the acrylate material(s) comprise from 0 or 3 to 60 or 80 weight percent, such as from 10 or 15 to 45 or 50, e.g., 20 to 45 (particularly 25 to 35 or 45) weight percent, of the formulation. Generally, the acrylate-based formulation contains at least one diacrylate material. The formulation also may contain one or more triacrylate materials, but if a triacrylate material is not used, then cross-linking can be provided by another monomer material in the formulation. Triacrylates can comprise from 0 to 25 or 30 weight percent, e.g., 0 or 5 to 15 or 30, or 10 or 15 to 25 weight percent, of the formulation. Higher functional acrylate materials, e.g., tetraacrylates, pentaacrylates and mixtures of tetraacrylates and pentaacrylates, may also be used in the formulation, such as in amounts of from 3 to 15 weight percent, such as from 5 to 10 weight percent, e.g., in amounts of approximately 5 weight percent. In one non-limiting embodiment, monoacrylate materials may comprise from 0 or 10 to 75 or 100 weight percent of the formulation. In alternate non-limiting embodiments, monoacrylate materials may comprise from 25 to 85 weight percent, such as from 35 to 75, e.g., from 40 to 70 weight percent, of the formulation. In particular, when the monoacrylate is a hydroxy-functional acrylate, it can comprise from 35 to 75, e.g., from 40 to 60, weight percent of the formulation. If alkoxysilyl acrylates are used in the formulation, from 5 to 15 weight percent of such materials can be used.

The aforedescribed percentages of the functional acrylate monomers are based on the total quantity of polymerizable monomeric materials comprising the radiation-curable acrylate-based composition, not including other non-polymerizable components, such as photoinitiators, stabilizers, plasticizers and other such components. The total of all of the various polymerizable monomeric materials comprising the curable acrylate-based formulation will, of course, equal 100 percent. The percentage of each of the functional acrylate monomers described heretofore can vary between any combination of the stated values, inclusive of the stated values.

In another non-limiting embodiment of the present invention, the radiation-curable acrylate-based composition is prepared from a composition comprising a mixture of free-radical initiated acrylate monomer(s) and cationic initiated epoxy monomer(s). In one non-limiting embodiment, the curable composition comprises from 10 to 85 percent by weight of at least one epoxy monomer(s) and from 90 to 15 percent by weight of at least one acrylate monomer(s). In alternate non-limiting embodiments, the curable composition comprises from 30 to 70 weight percent epoxy monomer(s) and from 70 to 30 weight percent acrylate monomer(s), e.g., from 35 to 50 weight percent epoxy monomer(s) and from 65 to 50 weight percent acrylate monomers. Monomers containing both epoxy and acrylic functionality are categorized herein as acrylate monomers. The range of acrylate monomers and epoxy monomers in the curable composition described heretofore can vary between any combination of the stated values, inclusive of the stated values.

Epoxy monomers used in acrylate-based formulations are generally epoxy monomers that are initiated by cationic initiators. Generally, the epoxy monomer is an epoxy condensation polymer, such as a polyglycidyl ether of an alcohol or phenol, and certain polyepoxy monomers and oligomers. Epoxy monomers, e.g., monomers having at least one epoxy group in the molecule, can be represented by the following general formula VI,

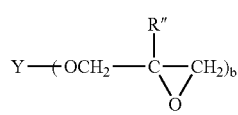

wherein Y is a residue of a b-valent alcoholic hydroxyl compound, a residue of a b-valent phenolic hydroxyl group-containing compound, or a residue of a b-valent carboxylic acid, R" is a hydrogen atom or a methyl group, and b is an integer of from 1 to 4, generally 1 to 2. These materials include, but are not limited to, alcoholic hydroxyl group-containing compounds of monohydric dihydric or trihydric alcohols, reaction products between phenolic hydroxyl compounds, such as phenol and hydroquinone and epichlorohydrin, and reaction products between carboxylic acids, such as benzoic acid and terephthalic acid, and epichlorohydrin. The epoxy monomer represented by formula VI may also contain (as part of Y) a radical polymerizable group (other than acrylic) such as a vinyl group or an allyl group.

Non-limiting examples of epoxy monomer compounds having at least one epoxy group in the molecule and not having a polymerizable group include those of formula VI wherein b is 1 or 2. When b is 1, Y can be an alkyl group of for example from 2 to 20 carbon atoms, which can be substituted by a hydroxyl group, a cycloalkyl group having from 6 to 7 carbon atoms, which can be substituted by a hydroxyl group, a phenyl group, which can be substituted by a hydroxyl group, a benzoyl group, which can be substituted by a carboxyl group, or a hydroxyalkyleneoxy group. When b is 2, Y can be an alkylene group containing for example from 2 to 20 carbon atoms, which can be substituted by a hydroxyl group, a cycloalkylene group, which can be substituted by a hydroxyl group, a phenylene group, which can be substituted by a hydroxyl group, a phthaloyl group, an isophthaloyl group, a terephthaloyl group, a 2,2'-bisphenylene propyl group, and an alkyleneoxy group. The alkyleneoxy group generally has from 1 to 20 alkyleneoxy groups, and the alkylene moiety can have from 2 to 4 carbon atoms.

Epoxy condensation polymers include polyepoxides having a 1,2-epoxy equivalency greater than 1, e.g., up to 3. Non-limiting examples of such epoxies are polyglycidyl ethers of aliphatic (cyclic and alicyclic) alcohols. Examples of aliphatic alcohols include, but are not limited to, ethylene glycol, diethylene glycol, 1,2-propylene glycol, 1,4-butylene glycol, 1,2-cyclohexanediol, 1,4-cyclohexanediol, 1,2-bis(hydroxymethyl)cyclohexane and hydrogenated bisphenol A. These epoxies are available from Resolution Performance Products under the HELOXY trade name. Examples of polyepoxide monomers and oligomers are described in U.S. Pat. No. 4,102,942 (column 3, lines 1-16), which disclosure is incorporated herein by reference. Aliphatic polyepoxides are available from the Dow Corporation under the CYRACURE trade name.

Non-limiting examples of copolymerizable acrylate materials are described previously in connection with the description of the dendritic polyester acrylate optical quality resin. That discussion is also applicable here.

The radiation curable acrylate-based composition generally contains at least one free radical photoinitiator. When the formulation includes cationic initiated epoxy monomer(s), the formulation will also contain at least one cationic photoinitiator. In one non-limiting embodiment, a combination of photoinitiators is used. The photoinitiator will be present in amounts sufficient to initiate and sustain the curing of the formulation, i.e., an initiating amount. Photoinitiators are typically used in the least amount necessary to obtain initiation of the curing process. Generally, the photoinitiator(s) is present in amounts of from 0.5 to 10 weight percent. In alternated non-limiting embodiments, the photoinitiator is present in amounts of from 0.5 to 6 weight percent, e.g., from 1 to 4 weight percent, based on the total weight of the photoinitiated polymerizable components in the curable acrylate-based composition. Free radical photoinitiators are well known to those skilled in the art. Non-limiting examples of commercial photoinitiators can be found in column 10, lines 38-43 of U.S. Pat. No. 5,910,375, which disclosure is hereby incorporated herein by reference. See also the subsequent description respecting photoinitiators in connection with the curing of photochromic coatings, which discussion is also applicable here.

Cationic photoinitiators can be used in conjunction with the free-radical photoinitiators. Generally, cationic initiators are used with abstraction type photoinitiators, hydrogen donor materials such as butyryl choline triphenylbutyl borate or combinations of such materials. Typical cationic photoinitiators are onium salts, which are described in U.S. Pat. No. 5,639,802, column 8, line 59 to column 10, line 46, which disclosue is hereby incorporated herein by reference. Non-limiting examples of such initiators include 4,4'-dimethyldiphenyliodonium tetrafluoroborate, phenyl-4-octyloxyphenyl phenyliodonium hexafluoroantimonate, dodecyl-diphenyl iodonium hexafluoroantimonate, [4-[(2-tetradecanol)oxy]phenyl]phenyl iodonium hexafluoroantimonate, triaryl sulfonium hexafluoroantimonate salts and triaryl sulfonium hexafluorophosphate salts, e.g., triphenylsulfonium salt of phosphorous hexafluoride. Mixtures of cationic initiators can also be used.

In a further non-limiting embodiment of the present invention, the multifocal optical resin layer can be prepared from a composition comprising an unsaturated polyester resin in amounts of from 25 to 70 weight percent (excluding monomer diluents, such as styrene. Unsaturated polyester resins are well known to those skilled in the art and can be prepared by the reaction of one or more polyols with one or more polycarboxylic acids (saturated and unsaturated), with olefinic unsaturation being provided by one or more of the reactants, usually the polycarboxylic acid. The polyester resin will generally have a number average molecular weight of from 1000 to 5000.

The polyester resin composition may also contain other copolymerizable monomers such as allylic esters, acrylate monomers and mixtures thereof. Non-limiting examples of allylic esters include diallyl phthalate, diethylene glycol bis(allyl carbonate), triallyl cyanurate, allyl acrylate and diallyl maleate. Acrylate monomers have been described in connection with the description of the dendritic polyester acrylate optical quality resin. That discussion is also applicable here. Non-limiting examples of acrylate monomers include monoacrylates, diacrylates, triacrylates, tetraacrylates, pentaacrylates and higher polyfunctional acrylates, which include methyl methacrylate, ethylene glycol diacrylate, ethylene glycol dimethacrylate, polyethylene glycol diacrylate, polyethylene glycol dimethacrylate, 1,6-hexanedioldiacrylate, ethoxylated bisphenol A diacrylate, ethoxylated bisphenol A dimethacrylate, trimethylolpropane polyoxyethylene triacrylate, dipentaerythritol pentaacrylate and bis(4-methacrylolylthiophenyl)sulfide. The allylic ester may represent from 1 to 20 weight percent of the polyester resin composition. The acrylate monomer may represent from 1 to 50 weight percent of the polyester composition.

The polyester composition can be cured by incorporating conventional photoinitiators in the composition, followed by irradiating the composition with radiation, e.g., ultraviolet light. Non-limiting examples of polyester compositions can be found in Tables 2, 3, 5, 7 and 8 of U.S. Pat. No. 6,863,848, which compositions are incorporated herein by reference. Further details of these compositions and their curing can be found in column 16, line 11 through column 21, line 48 of U.S. Pat. No. 6,863,848 B2, which disclosure is incorporated herein by reference.

Another non-limiting example of a composition that can be used to prepare the multifocal optical layer is a composition comprising an unsaturated polyester resin, an ethylenically unsaturated ester monomer, an optional vinyl monomer and a free radical polymerization catalyst. Such compositions are described in column 6, line 61 to column 10, line 54 of U.S. Pat. No. 5,319,007, which disclosure is incorporated by reference. The unsaturated polyester resin is derived from the interaction of saturated or unsaturated dicarboxylic acids with polyhydric alcohols.

Non-limiting examples of unsaturated dicarboxylic acids and saturated dicarboxylic acids are described earlier in connection with the preceding polyester resin embodiment. Non-limiting examples of polyhydric alcohols (polyols) are described earlier with respect to the preceding polyester resin embodiment. Such examples are also applicable in connection with this description. The base polyester resin generally has a molecular weight of from 1500 to 5200 with an average molecular weight of 2470 and a Brookfield viscosity at 25° C. of 440 centipoises. In addition to the base polyester, a flexible polyester can be included optionally.

The ethylenically unsaturated ester can be an aromatic ester represented by the following general formula:

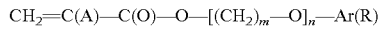

$CH_2=C(A)-C(O)-O-[(CH_2)_m-O]_n-Ar(R)$ wherein A comprises a $C_{1-12}$ alkyl, Ar comprises a phenylene molecule, R comprises a $C_{1-5}$ alkyl, m comprises an integer of 1 to 6, and n comprises an integer of 1 to 12, or the unsaturated ester can be an ester of an acrylic or methacrylic acid. Non-limiting examples of such ethylenically unsaturated esters include methyl acrylate, methyl methacrylate, phenoxyethyl acrylate, phenoxyethyl methacrylate, methoxyethyl methacrylate, methoxyethyl acrylate, ethoxyethyl methacrylate, and ethoxyethyl acrylate.

The optional vinyl monomers include, but are not limited to, ethylene, propylene, isobutylene and other alpha olefins; styrene-type monovinyl aromatic compounds such a styrene, methylstyrene, ethyl styrene and chlorostyrene; acrylic and, methacrylic acids and their lower alkyl esters; diallyl maleate, diallyl phthalate, triallyl mellitate, ethyl acrylate, methyl methacrylate, isopropyl methacrylate, dimethyl itaconate, ethylene glycol dimethacrylate, and diethylene glycol acrylate; acrylamide, methacrylamide, acrylonitrile and methacrylonitrile; and vinyl chloride.

Generally, the foregoing composition comprises from 80 to 95 parts by weight of the unsaturated polyester resin (including the flexible polyester resin), from 5 to 12 parts by weight of the ethylenically unsaturated ester, e.g., the ethylenically unsaturated aromatic ester, and 0.5 to 2 parts of a free radical initiator, e.g., peroxides and ketone peroxides. The unsaturated polyester resin may contain from 25 to 40 percent of a vinyl monomer, e.g., styrene.

A further non-limiting example of a composition that may be used to prepare the multifocal optical layer is a composition that includes a thiol compound represented by formula (1) of U.S. Pat. No. 6,706,894 B2. This thiol compound has three mercaptoalkyl groups bonded to a trithiane ring, wherein the mercaptoalkyl groups can be the same or different. Non-limiting examples of the thiol compound include 2,4,6-tris(mercaptomethyl)-1,3,5-trithiane and 2,4, 6-tris(mercaptoethyl)-1,3,5-trithiane. In addition to the thiol compound, the composition includes at least one material chosen from (a) a compound having at least two vinyl groups in one molecule, e.g., divinylbenzene, ethylene glycol di(meth)acrylate and trimethylolpropane tri(meth)acrylate, (b) a compound having at least two iso(thio)cyanate groups in one molecule, e.g., xylene diiso(thio)cyanate, 3,3'-dichlorodiphenyl-4,4'-diiso(thio)cyanate, 4,4'-diphenylmethane diiso(thio)cyanate, and hexamethylene diiso(thio) cyanate, and (c) a compound having at least one vinyl group and at least one iso(thio)cyanate group in one molecule, e.g., 2-(meth)acryloxyethyl iso(thio)cyanate and (meth)acryloyl iso(thio)cyanate. The term "iso(thio)cyanate" includes both an isocyanate and an isothiocyanate.

If desired, an episulfide compound, e.g., bis(beta-epithiopropylthio)methane may be included in the composition. More specific details of the thiol-containing composition can be found in column 2, line 62 through column 7, line 40 of U.S. Pat. No. 6,706,894 B2, which disclosure is incorporate herein by reference.

In a further non-limiting embodiment of the present invention, the multifocal layer may be formed from a formulation comprising an episulfide compound, such as the episulfide described in formula (1) of U.S. Pat. No. 6,696, 540 B2. Non-limiting examples of such episulfide compounds include 2,4,6-tris(epithiomethylthiomethyl)-1,3,5-trithiane; 2,4,6-tris(epithioethylthiomethyl)-1,3,5-trithiane; and 2,4,6-tris(epithiopropylthiomethyl)-1,3,5-trithiane. The formulation may comprise one or more of the episulfide compounds of formula (1), or can include other copolymerizable materials such as, but not limited to, other episulfide compounds, epoxy compounds and homopolymerizable vinyl monomers. Details of the episulfide of formula (1), its method of preparation and formulations comprising such episulfide compounds can be found in column 2, line 65 through column 6, line 7 of U.S. Pat. No. 6,696,540 B2, which description is incorporated herein by reference.

In a further non-limiting embodiment of the present invention, the multifocal layer may be prepared from a composition comprising a poly(thio)urethane, which is prepared by an addition reaction of the polyisocyanate compound described in formula (I) of U.S. Pat. No. 6,596,836 B2, e.g., 1,2,3-tris(isocyanatoethylthio)propane, with a component comprising a compound having two or more hydroxyl groups, e.g., ethylene glycol, trimethylolpropane, glycerin, dihydroxybenzene, etc., two or more mercapto groups, e.g., 2,5-bis(mercaptomethyl)-1,4-dithiane; 2,5-bis (mercaptomethyl)-1,4-dithiane dimer, trimer or higher polymer; or one or more hydroxyl and one or more mercapto groups, e.g., 2-mercaptoethanol; 2,3-dimercaptopropanol; 1,2-dihydroxy-3-mercaptopropane; 4-mercaptophenol, and the like. More specific details of the formulation comprising the poly(thio)urethane can be found in column 4, line 52 through column 10, line 50 of U.S. Pat. No. 6,596,836 B2, which description is incorporated herein by reference.

In a further non-limiting embodiment of the present invention, the multifocal layer may be prepared from a formulation comprising at least one mono(thio)(meth)acrylate monomer or di(meth)acrylate bearing a 5 to 8-membered heterocycle consisting of carbon, hydrogen and sulfur atoms and containing 2 or 3 endocyclic sulfur atoms, e.g., in positions 1-3 or 1-4 of the heterocycle. Generally, the heterocycle is 6 member. Such materials are described by formula (A) of U.S. Pat. No. 6,472,488 B2. The formulation may also include one or more copolymerizable monomers, such as mono- or polyfunctional vinyl, acrylic and methacrylic monomers. Non-limiting examples of such copolymerizable monomers include vinyl esters, such as vinyl acetate and vinyl butyrate. A more detailed description of the (thio)(meth)acrylate monomer and copolymerizable monomers can be found in column 1, line 56 through column 6, line 41, and column 36 through column 39, line 11 of U.S. Pat. No. 6,472,488 B2, which descriptions are incorporated herein by reference.

In a further non-limiting embodiment of the present invention, the multifocal optical resin layer may be prepared with a formulation comprising a poly(urea-urethane), which is the reaction product of at least one polyol, e.g., a diol, at least one polyisocyanate, and at least one polyamine curing agent. More particularly, the poly(urea-urethane) is the reaction product of components comprising (a) at least one polyol having greater than 1.0 hydroxyl groups per molecule, e.g., at least 2 hydroxyl groups per molecule, (b) at least one polyisocyanate having greater than 1.0 isocyanato groups per molecule, (c) at least one polyamine having greater than 1.0 amino groups per molecule, each amino group being chosen independently from primary amino and secondary amino groups, and (d) optionally at least one polyol having greater than 2.0 hydroxy groups per molecule, provided that the number of isocyanate groups of the isocyanate component is greater than the number of hydroxy groups of the polyol components.

Non-limiting examples of the polyol include 1,2-ethanediol, 1,2-propane diol, 1,3-propane diol, 1,4-butane diol, 1,6-hexane diol, and 2,2-dimethylpropane-1,3-diol. Other examples, include the polyalkylene glycols, such as diethylene glycol, triethylene glycol and tetraethylene glycol. In addition, ester diols and polyester diols can be used as the polyol. Also, poly(caprolactone diol), which is the reaction product of one or more diols and epsilon-caprolactone can be used.

The polyisocyanates that can be used are numerous and varied. These include aliphatic polyisocyanates, alicyclic polyisocyanates, aromatic polyisocyanates, and mixtures of such polyisocyanates. Non-limiting examples of such polyisocyanates include dicyclohexylmethane-4,4'-diisocyanate and hexamethylene diisocyanate.

The polyamine component can be chosen from aliphatic polyamines, cycloaliphatic polyamines, aromatic polyamines and polyamines of mixed aliphatic, cycloaliphatic, and/or aromatic types. Generally, the polyamine has at least two primary amino groups. Non-limiting examples of such polyamines include 3,5-dimethyl-2,4-toluenediamine; 3,5-dimethyl-2,6-toluenediamine, 3,5-diethyl-2,4-toluenediamine; 3,5-diethyl-2,6-toluenediamine; 3,5-diisopropyl-2,4-toluenediamine and 3,5-diisopropyl-2,6-toluenediamine.

A more detailed description of the poly(urea-urethane) and further examples of the polyols, polyisocyanates and polyamines can be found in column 2, line 60 through column.10, line 49 of U.S. Pat. No. 6,531,076 B2, which disclosure is incorporated herein by reference.

In a further non-limiting embodiment of the present invention, the multifocal optical quality resin layer may be prepared with a formulation comprising at least one episulfide monomer, typically two or more episulfide functionalities, and a polymerization catalyst comprising a phosphine having at least one alkoxyphenyl group. The polymerization catalyst and episulfide monomers are described in U.S. Pat. No. 6,417,322 B1. More particularly, the polymerizable episulfide monomer is described in formulae II, III and IV of that patent. One particular monomer disclosed is bis-(beta-epithiopropyl)sulfide. Non-limiting examples of the phosphine catalyst include alkoxyphenylphosphines, as described in formula I of the '322 patent, such as tris(3-methoxyphenyl)phosphine, tris(4-methoxyphenyl)phosphine, tris(2,6-dimethoxyphenyl)phosphine and tris(2,4,6-trimethoxyphenyl)phosphine.

The episulfide-containing formulation described in the '322 patent may include other copolymerizable monomers, e.g., in amounts up to 50 weight percent of the total weight of monomers present in the formulation. Non-limiting examples of such monomers include polythiol monomers, e.g., aliphatic polythiols such as pentaerythritol tetrakis mercaptopropionate, bis(2,2'-thioethyl) sulfide, and 1,2-bis (2'-mercaptoethylthio)-3-mercaptopropane; and monomers having one or more (meth)acrylate functionalities, e.g., 2-hydroxy-3-phenoxypropyl acrylate. A detailed description of the episulfides and formulations containing them are found in column 3, line 29 through column 7, line 50 of U.S. Pat. No. 6,417,322 B1, which disclosure is incorporated herein by reference.

In a further non-limiting embodiment of the present invention, the multifocal optical quality resin layer may be prepared with a formulation comprising at least one polymerizable monomer with a labile proton, and at least one polymerizable monomer comprising one or more iso(thio) cyanate functional groups. The term "polymerizable monomer with a labile proton" is understood to mean any monomer comprising one or more functional groups having at least one labile hydrogen atom, e.g., compounds comprising thiol, alcohol, and primary or secondary amine functional groups or combinations of such functional groups. These monomer formulations can be polymerized by adding to the formulation an activating agent chosen from phosphines and phosphorus halides, which formulations contain a conventional photoinitiator. A detailed description of the foregoing monomer formulations can be found in column 2, line 17 through column 8, line 32 of U.S. Pat. No. 6,225,021 B1, which disclosure is incorporated herein by reference.

In a further non-limiting embodiment of the present invention, the multifocal resin layer can be prepared with a composition comprising 100 parts by weight of a polymerizable monomer containing at least 10% by weight of a sulfur-containing (meth)acrylate polymerizable monomer represented by formula (1) of U.S. Pat. No. 6,194,511 B1. Non-limiting examples of such monomers include bis(2-methacryloyloxyethylthioethyl)sulfide; bis(2-acryloyloxyethylthioethyl)sulfide, bis(2-methacryloyloxyisopropylthioisopropyl)sulfide; and bis(2-methacryloyloxyethyl)sulfide. Optionally, the polymerizable formulation comprises (a) from 1 to 100 parts by weight of an epoxy-containing (meth)acrylate polymerizable monomer represented by formula (2) in column 3 of the '511 patent, e.g., glycidyl acrylate, glycidyl methacrylate and bisphenol A monoglycidylether methacrylate, (b) from 0 to 500 parts by weight of a (meth)acrylate polymerizable monomer other than compounds represented by formulae (1) and (2) of the '511 patent, and (c) 0 to 200 parts by weight of a styryl polymerizable monomer. A detailed description of the foregoing compositions can be found in column 3, line 1 through column 5, line 2; and column 7, line 1 through column 11, line 31 of U.S. Pat. No. 6,194,511 B1, which disclosures are incorporated herein by reference.

a further non-limiting embodiment of the present invention, the multifocal optical quality resin layer may be prepared from a polymerizable composition including an acrylic or methacrylic di- or polythiol monomer, as described in columns 1 and 2 of U.S. Pat. No. 6,172,140 B1, which disclosure is incorporated herein by reference. A non-limiting example of such a thiol monomer is the trithiomethacrylate of 4-mercaptomethyl-3,6-dithia-1,8-octanedithiol. Other non-limiting examples of such thiol monomers include the di- or poly thiol monomers of trimethylolpropane tris(3-mercaptopropionate), pentaerythritol tetrakis (3-mercaptoacetate), and trimethylolpropane tris (3-mercaptoacetate). The polymerizable composition may also include copolymerizable monomer(s) chosen from other methacrylates and acrylates, vinyls, vinyl ethers, allyls, epoxides, other thiols and the like, as described in column 5, line 4-through column 7, line 64 of U.S. Pat. No. 6,172,140 B1, which disclosure is incorporated herein by reference.

Another non-limiting example of a polymerizable composition that may be used to prepare the multifocal optical quality resin layer is a composition comprising a sulfur-containing urethane-based resin, which resin comprises a polythiol compound represented by the formula in column 2, lines 41-51 of U.S. Pat. No. 5,736,609, a polyiso(thio) cyanate compound, and a compound having two or more reactive unsaturated groups, as described in column 2, lines 52-61 of the '609 patent, which disclosures are incorporated herein by reference. A non-limiting example of the sulfur-containing urethane resin is a resin prepared by the reaction of the polythiol compound, 1,2-bis (2'mercaptoethylthio)-3-propanethiol, isophorone diisocyanate, and ethylene glycol dimethacrylate, as described in Example 1 of the '609 patent.

In a further non-limiting embodiment of the present invention, the multifocal optical quality resin layer can be prepared from a polymerizable composition comprising a high refractive index imparting monomer, bisphenol A bis (allyl carbonate) and an aromatic ring-containing inert plasticizer. Other monomers may also be present in the composition, e.g., acrylates and methacrylates, such as those described in column 3, lines 38-57 of the '064 patent, which disclosure is incorporated herein by reference. A detailed description of the foregoing polymerizable composition can be found in column 2, line 27 through column 6, line 26 of U.S. Pat. No. 5,708,064, which disclosure is incorporated herein by reference.

Non-limiting examples of the high refractive index imparting monomers include bisphenol A bis(meth)acrylate, ethoxylated bisphenol A bis(meth)acrylate containing 16 or less ethyleneoxy groups, phenoxyethyl (meth)acrylate, thiodiphenol bis(meth)acrylate, styrene, alpha-methylstyrene, divinylbenzene, diisopropenylbenzene, and diallyl phthalate. Non-limiting examples of the inert plasticizer include poly(ethylene glycol) dibenzoate, poly(propylene glycol) dibenzoate and 1,3-bis(phenylthio)propane.

In a further non-limiting embodiment of the present invention, the multifocal resin layer may be prepared from a copolymer comprising from 3 to 70 percent of a bisphenol A (meth)acrylate of formula I found in column 2, lines 48-65 of U.S. Pat. No. 4,306,780, and from 30 to 97 percent of at least one monomer chosen from those described by formulae II-IV found in column 3, lines 11-48 of the '780 patent, which disclosures are incorporated herein by reference.

Non-limiting examples of the bisphenol A (meth)acrylate include bisphenol A dimethacrylate and 2,2-bis(4-methacryloxy ethoxyphenyl) propane. Non-limiting examples of the second monomer of formulae II-IV include phenylmethacrylate, phenoxyethylacrylate, p-bromophenylmethacrylate, benzylmethacrylate, styrene, o-chlorostyrene, 2,6-dichlorostyrene, naphthyl methacrylate, phenoxyethylacrylate, phenoxyethylmethacrylate, 1-vinylnaphthalene, 2-vinyl naphthalene, 4-vinyl biphenyl, divinylbenzene and vinylphenylsulfide.

In another non-limiting embodiment of the present invention, the multifocal optical quality resin layer may be prepared from a polymerizable composition comprising from 30 to 55 weight percent of the bis(allyl carbonate) of a linear or branched alkylene glycol, from 20 to 55 weight percent of ethylenically unsaturated polyester having a number average molecular weight of less than 2000, and from 5 to 30 weight percent of unsaturated monomer chosen from lower alkyl ester of methacrylic acid, lower alkyl ester of unsaturated dicarboxylic acid having from 4 to 6 carbon atoms and the vinyl ester of a saturated monocarboxylic acid having from 1 to 3 carbon atoms. By lower alkyl is meant an alkyl group having from 1 to 5 carbon atoms. A detailed description of the foregoing polymerizable composition can be found in column 2, line 20 through column 7 line 55 of U.S. Pat. No. 4,139,578, which disclosure is incorporated herein by reference.

n accordance with a non-limiting embodiment of the present invention, multifocal optical articles, e.g., ophthalmic articles such as lenses, are prepared by utilizing a multifocal mold of a chosen design as the front mold, an optical quality resin composition, as for example described in this specification, and a preformed optical substrate ("the preform"), e.g., a preformed lens substrate, having a generally convex front surface, a generally concave back surface and a predetermined lens correction (if any) at its optical center, which substrate is adapted to provide a light influencing property, e.g., by means of light influencing coating, film or layer affixed to (on) the substrate, or a light influencing material within the substrate.

For example, the substrate can contain within the matrix of the substrate or on at least a portion of the substrate a fixed tint, a photochromic material, a polarizing compound, a material that provides two light influencing properties, e.g., photochromic/polarizing or photochromic/tint, or a combination of two or more of such light influencing materials. In a further contemplated non-limiting embodiment, the optical substrate can possess a light influencing function within the matrix of the substrate and one or more light influencing functions, e.g. a light influencing coating, on at least a portion of the surface of the optical substrate. In the later case, the light influencing function within and the light influencing function on the optical substrate complement each other. For example, the substrate matrix can comprise a polarizing layer E-Mail: kennelly@ppg.com while a photochromic material is positioned on the substrate above the polarizing layer. Further, fixed tints can be placed within or on the substrate, or photochromic materials can be placed within and on the substrate, provided that in each case the light influencing functions are complementary one to the other.

The design and lens correction of the underlying lens blank of a preformed lens substrate can vary, e.g., it can be but is not limited to a plano lens, a semi-finished lens, a finished lens, a single vision lens, a semi-finished single vision lens, a finished single vision lens, a magnifying lens, etc. Further, the base curve of the lens can also vary, e.g., the base curves can vary from 0.50 to 12.00 and any base curve therebetween.

In alternate non-limiting embodiments, additional coatings, films or layers ("coating") can be placed above or below the light influencing coating, film or layer, e.g., above a photochromic coating, and below the multifocal resin layer. Such additional coatings can include, but are not limited to, coatings providing additional functional features, e.g., light influencing features such as a polarizing layer, primer layers and adhesive layers.

The preformed article, e.g., a lens substrate, (the preform) comprising the optical substrate and, for example, a light influencing coating, is used as one part, e.g., the rear portion, of a two part mold set (with the light influencing coating of the preform, if such a coating, layer or film is used, facing the multifocal mold), while a multifocal mold of a selected design is used as the other part, e.g., the front portion, of the mold set.

In one non-limiting embodiment, the preformed optical lens substrate and multifocal mold are positioned close to but spaced from one another so as to form a cavity between them, e.g., by the use of an optical gasket or O-ring. The cavity should be of the desired shape and size, e.g., thickness, for the desired design of the multifocal layer. Optical quality resin composition is introduced into the cavity so that it fills the cavity. The resin composition is then cured, which results in the cured resin taking the shape of the multifocal mold and the cavity (including the surface of the preformed lens substrate facing the cavity), which shape also corresponds to the multifocal region of the multifocal mold. The curing process bonds the multifocal cured optical resin to the preformed lens. In one non-limiting embodiment, only a portion of the cavity or surface of the multifocal mold (or preformed lens surface) is covered by the optical resin composition that is dispensed into the cavity [or onto the mold surface(s)] to form the new lens surface.

In another non-limiting embodiment, the preform and the multifocal mold are aligned and placed in contact with one another. The two halves of the mold are held together with external force or pressure, e.g., by means of a clamp. The multifocal optical resin is injected between the preform and multifocal mold. The pressure holding the preform and mold against one another forces out excess resin. The resin is then cured using a curing method that is suitable for the multifocal optical resin chosen.

In a further non-limiting contemplated embodiment, the two halves of the mold set are aligned vertically and the optical resin composition is placed on the preformed lens substrate or on the multifocal mold (whichever is the lower mold) before the preformed lens substrate and the multifocal mold are configured with one another, e.g., brought together with a slight amount of pressure to form the shape of the finished lens. In these embodiments, an optical gasket is not used, but the two mold parts are held together by capillary attraction of the optical resin composition.

Multifocal molds can be made of any suitable material that will provide an optical quality surface to the finished lens surface. Such materials are known to those skilled in the art of casting lenses. Non-limiting examples of such materials are Crown glass and electroformed nickel. The design of multifocal molds are well known to those skilled in the art of casting lens and will vary depending on the type and nature of the multifocal corrections required. In a non-limiting embodiment, the surface of the multifocal mold is treated with a release agent to allow the cured optical quality resin to easily release from the mold without damage to the mold and without introducing imperfections into the surface of the cured resin.

Once the multifocal mold and preformed rigid optical substrate possessing the light influencing property, e.g., a photochromic coating, (the preform), are aligned in a position relative to one another, with the optical resin between the two, the resin composition is cured to harden and bond with the preform. The optical resin composition can be cured in any manner appropriate to the resin composition, e.g., using temperatures, initiators, catalysts, pressures, etc appropriate to the chosen multifocal optical resin composition, e.g., by exposure to heat (thermal or microwave curing), to ultraviolet (UV) radiation, or to a combination of radiation and heat-either simultaneously or sequentially.

Thermal initiators/catalysts and/or UV initiators are mixed with the multifocal optical resin composition before it is applied to the preform or multifocal mold, or charged to the cavity between the preform and multifocal mold. The particular thermal or photoinitiator initiator (and the amount used) or type of UV used will be a function of the chosen optical quality resin composition, the type and design of the multifocal mold and the particular lens preform used. Those skilled in the art are well versed in the appropriate catalyst and/or initiator requirements (and their amounts) and the type of UV lamps and/or heating cycle required. Such information can also be found in the published literature relating to such compositions, such as the patents cited above that describe non-limiting examples of multifocal optical quality resin compositions that can be used for the multifocal resin layer.

Some optical resin compositions are cured by the application of both heat and UV applied sequentially or simultaneously. In addition, it is contemplated that a post cure of the multifocal optical article may be used. After the initial curing of the optical resin composition (whether by radiation and/or thermal means), the cured multifocal optical article can be treated (either removed from or still attached to the multifocal mold) to a further thermal and/or UV radiation post cure step.

The thickness of the cured multifocal optical resin can vary and will depend on the requirements of the ultimate multifocal article. For example, in the case of an ophthalmic lens, the thickness will depend on the relative curvature of the convex surface of the preform and the concave surface of the multifocal mold. The cured resin layer can have a uniform thickness or be non-uniform depending on the curvature of the multifocal mold, as is well known to those skilled in the art. See, for example, U.S. Pat. No. 5,366,668, which describes the preparation of a bifocal lens using a bifocal mold having a smaller radius of curvature than the lens blank used to prepare the lens. The disclosure of the '668 patent respecting the shape and thickness of the cured resin is incorporated herein by reference. The finished lens has a first lens correction (a distance power), and a second region (the multifocal region) removed from the optical center that provides a second lens correction, e.g., a near segment power.

Prior to using the preform as one-half of the mold set, it is common, but not required, to treat the surface on the preform to which the multifocal optical resin is to be appended, e.g., the photochromic coating, to enhance adhesion of the multifocal optical resin, e.g., the dendritic polyester acrylate, to the preform. Effective treatments include activated gas treatment, such as treatment with a low temperature plasma or corona discharge. Such treatments enhance adhesion of the multifocal resin layer to the treated surface of the preform, and is a clean and efficient way to alter the physical surface of the preform, e.g., by roughening and/or chemically altering the surface without affecting the rest of the article. Inert gases, such as argon, and reactive gases, such as oxygen, have been used as the plasma gas. Inert gases will roughen the surface, while reactive gases such as oxygen will both roughen and chemically alter slightly the surface exposed to the plasma, e.g., by producing hydroxyl or carboxyl units on the surface. In a non-limiting embodiment, oxygen is used as the plasma gas because it generally provides a slight, but effective, physical roughening of the surface along with a slight, but effective, chemical modification of the surface. Naturally, the extent of the surface roughening and/or chemical modification will be a function of the plasma gas and the operating conditions of the plasma unit (including the length of time of the treatment).

Radiation curing of the multifocal optical resin can be accomplished by exposure to UV radiation, e.g., radiation in the range of 200 and 450 nanometers. The radiation can contain in its spectra both visible and ultraviolet light. The radiation can be monochromatic or polychromatic, incoherent or coherent and should be sufficiently intense to initiate the polymerization/crosslinking of the resin. Any appropriate type of UV lamp, e.g., mercury vapor or pulsed xenon, can be used. If a photoinitiator is used, the absorbance spectra of the photoinitiator(s) should be matched with the spectral output of the UV lamp (bulb), e.g., an H bulb, D bulb, Q bulb or V bulb, for the highest curing efficiency. Following the radiation cure, e.g., UV cure, a thermal post cure can be used, if required, to cure the multifocal layer completely. Heating in an oven at 212° F. (100° C.) for from 0.5 to 3 hours is generally adequate.

As an alternative to radiation curing, the multifocal optical resin can be cured thermally, although thermal curing is less desirable. For example, a thermal azo-type or peroxy-type free radical initiator can be incorporated into the curable resin formulation and the formulation cured by infrared heating or by placing the preform, optical resin and multifocal mold in a conventional oven, e.g., a convection oven, maintained at temperatures sufficient to cure the optical resin. Temperatures used to cure the multifocal optical resin will, of course, depend on the composition of the resin employed. Such temperatures are known to those skilled in the art or can be readily obtained from the published literature associated with the type of resin, as for example the United States Patents and publications describing the multifocal optical quality resins noted above. Non-limiting examples of photoinitiators have been described previously in connection with the curing of the optical quality resin, and such description is also applicable here.

Optical substrates that can be used for the multifocal article can vary and, depending on the ultimate application, include any optical, e.g., ophthalmic, typically rigid, substrate. Non-limiting examples of such substrates include polymeric substrates, such as glass and optical organic-polymeric materials.

As used in this description, the term "glass" is defined as being a polymeric substance, e.g., a polymeric silicate. Glass substrates can be of any type suitable for the intended purpose; but generally are a clear, low colored, transparent glass such as the well-known silica type of glass, particularly soda-lime-silica glass. The nature and composition of various silica glasses are well known in the art. The glass can be a strengthened glass, e.g., strengthening by thermal or chemical tempering.

Organic polymeric substrates that can be used to prepare the multifocal articles described herein, are any of the currently known (or later discovered) transparent plastic materials that are useful as optical substrates and that are chemically compatible with the light influencing coatings associated with the substrate, e.g., a photochromic polymeric coating. In a non-limiting embodiment, the organic polymeric substrate is chosen from the art-recognized synthetic organic resins, e.g., organic optical resins, that are used to prepare optically clear castings for optical applications, such as ophthalmic lenses.

Non-limiting examples of organic optical substrates that can be used are polymers, e.g., homopolymers and copolymers, prepared from the monomers and mixtures of monomers disclosed in U.S. Pat. No. 5,962,617, and from column 15, line 28 to column 16, line 17 of U.S. Pat. No. 5,658,501, which disclosure is incorporated by reference. Such organic substrates can be thermoplastic or thermoset polymeric substrates. Non-limiting embodiments of such polymeric substrates include thermoplastic polymers having a high glass transition temperature, and highly cross-linked optical polymers. In a non-limiting embodiment, the organic substrates can be transparent substrates having a refractive index that ranges from 1.48 to 1.74. In alternate non-limiting embodiments, the substrate can have a refractive index of from 1.54 to 1.56, or greater than 1.60, e.g., from 1.60 to 1.74.

Non-limiting examples of such disclosed monomers and polymers include: polyol(allyl carbonate) monomers, e.g., allyl diglycol carbonates such as diethylene glycol bis(allyl carbonate), which monomer is sold under the trademark CR-39 by PPG Industries, Inc, and copolymers thereof; polyurea-polyurethane (polyurea urethane) polymers, which are prepared, for example, by the reaction of a polyurethane prepolymer and a diamine curing agent, a composition for one such polymer being sold under the trademark TRIVEX by PPG Industries, Inc; acrylic functional monomers, such as but not limited to, polyol(meth)acryloyl terminated carbonate monomers; diethylene glycol dimethacrylate monomer; ethoxylated phenol methacrylate monomers; diisopropyl benzene monomer; ethoxylated trimethylol propane triacrylate monomers; ethylene glycol bismethacrylate monomer; poly(ethylene glycol) bismethacrylate monomers; urethane acrylate monomers; poly(ethoxylated bisphenol A dimethacrylate) monomers; poly(vinyl acetate); poly(vinyl alcohol); poly(vinyl chloride); poly(vinylidene chloride); polyolefins, such as polyethylene and polypropylene; polyurethanes; polythiourethanes monomers, which include, but are not limited to materials such as the MR-6, MR-7, MR-8 and MR-10 optical resins sold by Mitsui Chemicals, Inc; thermoplastic polycarbonates, such as the thermoplastic bisphenol A-based polycarbonates, e.g., a carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanate(s) with polythiol(s) or polyepisulfide monomers (such as the monomer sold under the trade name IU-10 by Mitsubishi Gas Chemicals, Inc.), either homopolymerized or co-and/or terpolymerized with polythiols, polyisocyanates, polyisothiocyanates and optionally ethylenically unsaturated monomers or halogenated aromatic-containing vinyl monomers. Generally, the organic optical substrate is chemically compatible with any polymeric coating, e.g., a coating possessing a light influencing property such as a photochromic coating that is affixed to the surface of the substrate.

The polymeric organic optical substrate used to prepare the multifocal articles of the present invention can have a protective coating, e.g., an abrasion-resistant coating, on its surface. For example, commercially available thermoplastic polycarbonate optical lenses are typically sold with an abrasion-resistant coating, e.g., a hard coat, already applied to its surface(s) because the surface tends to be readily scratched, abraded or scuffed. An example of such a lens is the Gentex polycarbonate lens (available from Gentex Optics) that is sold with a hard coat already applied to the polycarbonate surface. As used in this disclosure and claims, the terms "substrate", "optical substrate", "polymeric organic substrate" (or similar terms) or "surface" of such a substrate, means either the substrate itself or such a substrate with one or more coatings, e.g., a base coating such as a protective coating, an adhesive coating, and/or a primer coating, on the substrate. Accordingly, when reference is made in this disclosure or claims to applying a primer coating or light influencing coating to the surface of the substrate, such reference includes applying such a coating to the polymeric organic substrate per se or to a base coating, e.g., an abrasion-resistant coating, primer or other coating, on the surface of the substrate. Such base coatings can be any suitable coating or film and is not limited to an abrasion-resistant coating (hard coat) or primer coating. Non-limiting examples of such coatings/films include protective coatings, primer coatings, coatings to improve impact resistance, or coatings that provide additional functional properties, e.g., light influencing properties, to the article of which the substrate is a part.

Further, as used in this specification and claims the term "surface of the optical substrate" or like terms, e.g., the surface to which a light influencing layer is applied, includes the embodiment wherein only a portion of the surface of the substrate is covered. Hence, the light influencing layer (and the multifocal optical resin layer) can cover only a portion of a surface of the optical substrate, but generally it is applied to the entire surface of at least one substrate surface.

The use of photochromic organic coatings on plastic optical substrates, particularly substrates such as thermoplastic polycarbonates, has been described. Any organic polymeric material that can be used as a coating with the chosen organic substrate and that will function as a host material (carrier) for the organic photochromic materials/compounds selected for use can be used. Generally, the host organic polymeric coating has sufficient internal free volume for the photochromic material to function efficiently, e.g., to change from a colorless form to a colored form that is visible to the naked eye in response to ultraviolet (UV) radiation, and to change back to the colorless form when the UV radiation is removed.

Non-limiting examples of such organic polymeric materials include polyurethane-based coatings, such as those described in U.S. Pat. Nos. 6,107,395 and 6,187,444 B1, and International Patent Publication WO 01/55269; epoxy resin-based coatings, such as those described in U.S. Pat. No. 6,268,055 B1; acrylic/methacrylic monomer-based coatings, such as those described in U.S. Pat. No. 6,602,603, International Patent Publications WO 96/37593 and WO 97/06944, and U.S. Pat. Nos. 5,621,017 and 5,776,376; aminoplast, e.g., melamine type, resins, such as those described in U.S. Pat. Nos. 6,506,488 B1 and 6,432,544 B1; coatings comprising hydroxyl-functional components and polymeric anhydride-functional components, e.g., polyanhydride coatings, such as those described in U.S. Pat. No. 6,436,525 B1; polyurea urethane coatings, such as those described in International Patent Publication WO 01/57106 A1, which is entitled "Photochromic Coated Article"; and coatings comprising N-alkoxymethyl(meth)acrylamide functional polymers, such as those described in U.S. Pat. No. 6,060,001.

Polyurethanes that can be used to prepare photochromic polyurethane coatings are those produced by the reaction of an organic polyol component and an isocyanate component, as more fully described in column 3, line 4 through column 6, line 22 of U.S. Pat. No. 6,187,444 B1, which disclosure is incorporated herein by reference.

The relative amounts of the components comprising the polyurethane reaction mixture can be expressed as a ratio of the available number of reactive isocyanate groups to the available number of reactive hydroxyl groups, e.g., a ratio of NCO:OH groups of from 0.3:1.0 to 3.0:1.0. The isocyanate component can be an aliphatic, aromatic, cycloaliphatic or heterocyclic isocyanate, or mixtures of such isocyanates. Generally, the isocyanate component is selected from blocked or unblocked aliphatic or cycloaliphatic isocyanates, or mixtures of such isocyanates.

As further described in U.S. Pat. No. 6,107,395, polyurethanes that can be used as a photochromic host material may be prepared from an isocyanate reactive mixture comprising (i) from 40 to 85 weight percent of one or more polyols having a nominal functionality of from 2 to 4 and molecular weights of from 500 to 6000 g/mole, (ii) from 15 to 60 weight percent of one or more diols or triols or mixtures thereof having a functionality of from 2 to 3 and molecular weights of from 62 to 499, and (iii) an aliphatic polyisocyanate having a functionality of less than 3, e.g., 2.

U.S. Pat. No. 6,602,603 describes reaction mixtures for poly(meth)acrylic host materials for photochromic materials. These reaction mixtures comprise at least two difunctional (meth)acrylate monomers, which can have from greater than 3 to less than 15 alkoxy units. In one non-limiting embodiment, a difunctional (meth)acrylate has the reactive acrylate groups connected by a straight or branched chain alkylene group, which generally contains from 1 to 8 carbon atoms; while a second difunctional (meth)acrylate has the reactive acrylate groups connected by ethylene oxide, propylene oxide, butylene oxide or mixtures of such oxide groups in random or block order.

Epoxy resin-based coatings are described in U.S. Pat. No. 6,268,055 B1. Such coatings are prepared by the reaction of a composition comprising an epoxy resin or polyepoxide, e.g., polyglycidyl ethers of aliphatic alcohols and phenols, epoxy-containing acrylic polymers, polyglycidyl esters of polycarboxylic acids and mixtures of such epoxy-containing materials, with a curing agent, e.g., a polyacid comprising a half-ester formed from reacting an acid anhydride with an organic polyol.

The amount of photochromic coating applied to at least a portion of at least one surface of the substrate is that amount which provides a sufficient quantity of organic photochromic material to produce a coating that exhibits a desired change in optical density ($\Delta OD$) when the cured coating is exposed to ultraviolet (UV) radiation, i.e., a photochromic amount. In one non-limiting embodiment, the change in optical density measured at 22° C. (72° F.) after 30 seconds of UV exposure is at least 0.05. In alternate non-limiting embodiment s, the change in optical density after 30 seconds of UV exposure is at least 0.15, e.g., at least 0.20. In one non-limiting embodiment, the change in optical density after 15 minutes of LN exposure is at least 0.10. In alternate non-limiting embodiments, the change in optical density after 15 minutes is at least 0.50, e.g., at least 0.70.

Stated alternatively, the amount of active photochromic material used in the photochromic coating can range from 0.5 to 40.0 weight percent, based on the total weight of monomer(s)/resin(s) used to produce the coating. Generally, the concentration of active photochromic material(s) within the photochromic coating ranges from 1.0 to 30 weight percent. In alternate non-limiting embodiments, the concentration of active photochromic material(s) within the photochromic coating ranges from 3 to 20 weight percent, e.g., from 3 to 10 weight percent (based on the total weight of monomer(s)/resin(s) used to produce the coating.) The amount of photochromic material(s) in the coating can vary between any combination of these values, inclusive of the recited values.

The thickness of the photochromic coating applied to the surface of the optical substrate can vary. In one non-limiting embodiment, the thickness of the photochromic coating is at least 3 microns. In alternate non-limiting embodiments, the thickness of the photochromic coating is at least 5 microns, e.g., at least 10 microns, such as at least 20 or 30 microns. In one non-limiting embodiment, the thickness of the photochromic coating is not more than 200 microns. In alternate non-limiting embodiments, the thickness of the photochromic coating is not more than 100 microns, e.g., not more than 50 microns, such as not more than 40 microns. The thickness of the photochromic coating can range between any combinations of these values, inclusive of the recited values. For example, the photochromic coating can range from 5 to 50 microns, e.g., 10 or 20 to 40 microns. In a non-limiting embodiment, the applied photochromic coating is free of cosmetic defects, such as scratches, pits, spots, cracks, inclusions, etc.

In one non-limiting embodiment, the hardness of the photochromic coating is less than the multifocal resin layer, which in turn can be softer than an abrasion-resistant (hard coat) coating that can be applied to the multifocal resin layer. The hardness of coatings can be quantified by tests known to those skilled in the art, e.g., Fischer microhardness, pencil hardness or Knoop hardness.

Photochromic materials, e.g., photochromic dyes/compounds or compositions containing such dye/compounds, that may be utilized for the photochromic coating are inorganic and/or organic photochromic compounds and/or substances containing such organic photochromic compounds that are currently known to those skilled in the art (or that are later discovered). The particular photochromic material(s) chosen will depend on the ultimate application and the color or hue desired for that application. When two or more photochromic compounds are used in combination, they are generally chosen to complement one another to produce a desired color or hue.

Organic photochromic compounds used in photochromic coatings commonly have at least one activated absorption maxima within the visible spectrum of between 300 and 1000, e.g., between 400 and 700, nanometers. The organic photochromic material(s) is incorporated, e.g., dissolved or dispersed, in the photochromic coating, and color when activated, e.g., when exposed to ultraviolet radiation, the photochromic material(s) changes to the color or hue that is characteristic of the colored form of such material(s).

The inorganic photochromic material generally contains crystallites of silver halide, cadmium halide and/or copper halide. In a non-limiting embodiment, the halide material is the chloride and bromide. Other inorganic photochromic materials can be prepared by the addition of europium (II) and/or cerium (III) to a mineral glass, such as a soda-silica glass. In one non-limiting embodiment, the inorganic photochromic material(s) are added to molten glass and formed into particles that are incorporated into the coating composition that is used to form the polymeric photochromic coating. Such inorganic photochromic materials are described in the *Kirk Othmer Encyclopedia of Chemical Technology*, 4$^{th}$ Edition, Volume 6, pages 322-325. In an alternate non-limiting embodiment, the photochromic material is a metal dithizonate, e.g., mercury dithizonate, which is described in, for example, U.S. Pat. No. 3,361,706.

Organic photochromic compounds that may be used in a photochromic coating can vary. In one non-limiting embodiment, the organic photochromic compound is chosen from pyrahs such as benzopyrans, chromenes, e.g., naphthopyrans, such as, naphtho[1,2-b]pyrans, and naphtho[2,1-b]pyrans, spiro-9-fluoreno[1,2-b]pyrans, phenanthropyrans, quinopyrans, and indeno-fused naphthopyrans, such as those disclosed in U.S. Pat. No. 5,645,767 at column 1, line 10 to column 12, line 57, and U.S. Pat. No. 5,658,501 at column 1, line 64 to column 13, line 36, which disclosures are incorporated herein by reference. In alternate non-limiting embodiments, organic photochromic compounds that may be used include the oxazines, such as benzoxazines, naphthoxazines and spiro(indoline)pyridobenzoxazines; fulgides and fulgimides, e.g. the 3-furyl and 3-thienyl fulgides and fulgimides, which are described in U.S. Pat. No. 4,931,220 at column 20, line 5 through column 21, line 38, which disclosure is incorporated herein by reference; diarylethenes, which are described in U.S. Patent application 2003/0174560 from paragraphs [0025] to [0086], which disclosure is incorporated herein by reference; and mixtures of any of the aforementioned photochromic materials/compounds.

A photochromic coating can contain one photochromic compound or a mixture of two or more photochromic compounds, as desired. Mixtures of photochromic compounds can be used to attain certain activated colors such as a near neutral gray or near neutral brown. See, for example, U.S. Pat. No. 5,645,767, column 12, line 66 to column 13, line 19, which describes the parameters that define neutral gray and brown colors and which disclosure is incorporated herein by reference.

In addition to photochromic materials, a photochromic coating (or precursor formulation) can contain additional conventional adjuvants that impart desired properties or characteristics to the coating that are required by the process used to apply and cure the photochromic coating on the surface of the plastic substrate, or that enhance the performance of the coating. Such adjuvants include, but are not limited to, ultraviolet light absorbers, light stabilizers, such as hindered amine light stabilizers (HALS), asymmetric diaryloxalamide (oxanilide) compounds, and singlet oxygen quenchers, e.g., a nickel ion complex with an organic ligand, antioxidants, polyphenolic antioxidants, heat stabilizers, rheology control agents, leveling agents, e.g., surfactants, free radical scavengers and adhesion promoting agents, such as silane coupling agents, e.g., trialkoxy silanes, such as silanes having an alkoxy radical of 1 to 4 carbon atoms, including, but not limited to, γ-glycidoxypropyl trimethoxy silane, γ-aminopropyl trimethoxysilane, 3,4-epoxy cyclohexylethyl trimethoxysilane, dimethyldiethoxysilane, aminoethyl trimethoxysilane, and 3-(trimethoxysilyl)propyl methacrylate. In a non-limiting embodiment, mixtures of such photochromic performance enhancing adjuvant materials can be used. See, for example, the materials described in U.S. Pat. Nos. 4,720,356, 5,391,327 and 5,770,115.

In a non-limiting embodiment, compatible (chemically and color-wise) tints, e.g., dyes, can also be added to the photochromic coating formulation or applied to the plastic optical substrate for various reasons, including, but not limited to, medical reasons, for reasons of fashion, e.g., to achieve a more aesthetic result, or to absorb a certain wavelength of light, such as described in U.S. Pat. No. 6,853,471. The particular dye chosen can vary, but its choice will generally depend on one or more of the aforesaid needs and results to be achieved. In one non-limiting embodiment, the dye is chosen to complement the color resulting from the activated photochromic materials used, e.g., to achieve a more neutral color or absorb a particular wavelength or incident light. In another non-limiting embodiment, the dye is chosen to provide a desired hue to the substrate and/or coating when the photochromic coating is in an inactivated state.

Photochromic coating compositions can be applied to the surface of an optical substrate as a polymerizable formulation and then cured (polymerized) by methods well known to those skilled in the art including, but not limited to, photopolymerization, thermal polymerization (including infrared polymerization), and other sources of radiation. Such application methods include the art-recognized methods of spin coating, curtain coating, dip coating, spray coating or by methods used in preparing overlays. Such methods are described in U.S. Pat. No. 4,873,029.

When applied as a polymerizable formulation, the photochromic coating formulation will also typically contain at least one catalyst or polymerization initiator that is used to cure the photochromic dye host resin. Generally, only that amount of catalyst or initiator that is required to initiate (catalyze) and sustain the polymerization reaction is required, i.e., an initiating or catalytic amount. In one non-limiting embodiment, the amount of initiator or catalyst varies from 0 to 10 weight percent, based on the total weight of the polymerizable monomer(s) in the formulation. In alternate non-limiting embodiments, the amount of initiator or catalyst varies from 0.01 to 8 weight percent, e.g., from 0.1 to 5 weight percent, based on the total weight of the polymerizable monomer(s) in the formulation. The amount of catalyst/initiator may range between any combinations of the aforestated values, inclusive of the recited values.

In one non-limiting embodiment, the photochromic coating is cured by photopolymerization, e.g., the curable photochromic coating is cured in the presence of at least one photoinitiator using ultraviolet light and/or visible light. Photoinitiators, which are free radical initiators, are classified in two major groups based upon their mode of action. Cleavage-type photoinitiators include, but are not limited to, acetophenones, α-aminoalkylphenones, benzoin ethers, benzoyl oximes, acylphosphine oxides and bisacylphosphine oxides. Abstraction-type photoinitiators include, but are not limited to, benzophenone, Michler's ketone, thioxanthone, anthraquinone, camphorquinone, fluorone and ketocoumarin. Abstraction-type photoinitiators function better in the presence of materials such as amines and other hydrogen donor materials added to provide labile hydrogen atoms for abstraction. Typical hydrogen donors have an active hydrogen positioned alpha to an oxygen or nitrogen, e.g., alcohols, ethers and tertiary amines, or an active hydrogen atom directly attached to sulfur, e.g., thiols. In the absence of such added materials, photoinitiation can still occur via hydrogen abstraction from monomers, oligomers or other components of the system. Photoinitiators are well known to those skilled in the art and have been described earlier in connection with the discussion of the dendritic polyester acrylate optical quality resin, which discussion is also applicable here. Photoinitiators are commercially available from various sources. Non-limiting examples of commercial photopolymerization initiators include those available from Ciba-Geigy, e.g., IRGACURE photoinitiators, such as Irgacure 184, 651, 500, 907 and 369, DARACURE photoinitiators such as Daracure 1173 and 4265. Other commercial photoinitiators include SARTOMER KIP 100F and EBERCRYL P36.

The source of radiation used for photopolymerization is selected from those sources that emit ultraviolet light and/or visible light. The source of radiation can be a mercury lamp, a mercury lamp doped with $FeI_3$ and/or $GaI_3$, a germicidal lamp, a xenon lamp, a tungsten lamp, a metal halide lamp, a light emitting diode or a combination of such lamps. Generally, the radiation curable photochromic coating is cured in an inert atmosphere, e.g., in the substantial absence of oxygen.

Photochromic coatings may be cured thermally, which generally involves heating the coating from room temperature to temperatures below which the substrate is-not damaged due to such heating. Temperatures up to 200° C. have been reported. Such cure conditions are well known in the art. For example, a typical thermal cure cycle may involve heating the curable formulation from room temperature (22° C.) to from 85 to 125° C. over a period of from 2 to 20 minutes.

Prior to applying a photochromic coating to the surface of an optical substrate, the surface of the substrate is often cleaned and treated to provide a clean surface and a surface that will promote wetting and adhesion of the photochromic coating to the substrate. Effective cleaning and treatments generally used include, but are not limited to, ultrasonic washing with an aqueous soap/detergent solution, cleaning with an aqueous mixture of organic solvent, e.g., a 50:50 mixture of isopropanol:water or ethanol:water, UV treatment, activated gas treatment, e.g., treatment with low temperature plasma or corona discharge, as described earlier, and chemical treatment that results in hydroxylation of the substrate surface, e.g., etching of the surface with an aqueous solution of alkali metal hydroxide, e.g., sodium or potassium hydroxide, which solution can also contain a fluorosurfactant.

In some cases, a primer coating is applied to the surface of the optical substrate before application of a photochromic coating. The primer coating is interposed between the substrate and the photochromic coating, and serves as a barrier coating to prevent interaction of the components comprising the photochromic coating with the substrate and vice versa, and/or as an adhesive layer to promote adhesion of the photochromic coating to the plastic substrate.

When the light influencing function is polarization, a polarizing medium may be applied to the optical substrate, either alone or in combination with another light influencing layer, e.g., a photochromic or tinted coating. The polarizing function may be supplied by polarizing coatings, films, wafers, etc ("polarizers"). The polarizer can comprise a variety of different constructions and materials, including free standing or non-laminated polarizing films, and polarizing films with removable protective sheeting or outer permanent protective coatings or supportive sheeting, e.g., plastic layers. Such polarizers are well known to those skilled in the art.

Polarizers can comprise polarizing polyvinyl alcohol (PVA) films and the like. Polarizing PVA films are generally protected by two protecting outside plastic sheets. These plastic sheets and the enclosed PVA film form a polarizer sandwich that is often referred to as a wafer. Other polarizers can be prepared from more durable materials, such as polyethylene terephthalate (PET), as described in U.S. Pat. No. 6,585,373. The polarizer can comprise polarizing materials such as iodine and other dichroic materials.

The polarizer may be utilized as the light influencing layer alone by appending the polarizing film, coating, wafer, etc on the substrate to form the "preform" to which the multifocal optical coating is affixed, or used in combination with other light influencing layers, e.g., by placing the polarizing medium below or on top of a photochromic coating or tinted polymeric coating, or on a tinted optical substrate.

Similarly, the light influencing layer can be a tinted polymeric film, coating, etc. that is affixed to the optical substrate. This tinted polymeric layer can be prepared by tinting a polymeric material with a chosen tint or dye, e.g., by imbibing the dye into a preformed film, immersing the preformed film into a liquid containing the dye, incorporating the dye into a polymerizable composition used to form the coating or film, etc. Any polymeric film, e.g., transparent film, or coating known to those skilled in the art for use with optical articles, e.g., ophthalmic articles, can be used as a carrier for the dye. Similarly, any of those tints or dyes known to those skilled in the art for use with optical articles can be used. Care should be observed when using a tinted coating or film that the tint not be so opaque that the resulting article does not function in the manner intended, or that the tint (dye) not absorb ultraviolet light required to activate photochromic materials, if the tint (dye) coating or film is placed between a photochromic coating and the incident actinic light.

In one non-limiting embodiment, an abrasion-resistant coating is placed on the multifocal optical resin layer. Abrasion-resistant coatings (hard coats), particularly abrasion-resistant coatings comprising organo silane material(s), are used to protect surfaces from abrasion, scratches, etc. Organo silane-containing abrasion-resistant coatings, e.g., silane-based hard coatings, are well known in the art, and are commercially available from various manufacturers, such as SDC Coatings, Inc. and PPG Industries, Inc. Reference is made to column 5, lines 1-45 of U.S. Pat. No. 4,756,973, and to column 1, lines 58 through column 2, line 8, and column 3, line 52 through column 5, line 50 of U.S. Pat. No. 5,462,806 which disclosures describe organo silane hard coatings. Such disclosures are incorporated herein by reference. Reference is also made to U.S. Pat. Nos. 4,731,264, 5,134,191, 5,231,156 and International Patent Publication WO 94/20581 for disclosures of organo silane hard coatings.

Other coatings that provide abrasion and scratch resistance, such as polyfunctional acrylic hard coatings, melamine-based hard coatings, urethane-based hard coatings, alkyd-based coatings, silica sol-based hard coatings or other organic or inorganic/organic hybrid hard coatings can also be used as the abrasion-resistant coating.

The abrasion-resistant coating (hard coat) can be applied to, for example, the multifocal optical resin layer, by conventional application techniques, e.g., spin coating, dip coating, etc. The abrasion resistant coating may be applied at a thickness of from 0.5 to 10 microns. Prior to applying the hard coat, e.g., the organo silane hard coat, the multifocal optical resin layer (or coating/film to which the hard coat is applied) can be treated to enhance its wetting and adhesion of the hard coat. Such treatments, e.g., the plasma treatments described previously can be used.

In a further non-limiting embodiment, additional coatings, such as antireflective coatings, can be applied to the hard coat layer. Examples of antireflective coatings are described in U.S. Pat. No. 6,175,450 and International Patent Publication WO 00/33111.

The present invention is more particularly described in the following examples, which are intended as illustrative only, since numerous modifications and variations therein will be apparent to those skilled in the art. In the examples, percentages are reported as weight percent, unless otherwise specified. Materials, such as monomers, catalysts, initiators, etc., which are identified in one example by a lower case letter in parenthesis and which are used in other examples, are identified in the subsequent examples with the same lower case letter.

In the following examples, semi-finished, single vision (SFSV) Sola ASL polycarbonate lenses of various base curves were used. Further, a variety of multifocal optical resins, lens blanks and certain process conditions were used in the examples in order to illustrate the invention. A variety of process variables can be observed by one skilled in the art to prepare a cosmetically acceptable, multifocal optical layer. Such variables include, but are not limited to, close matching of the radius of curvature of the multifocal mold, e.g., the glass mold, with an appropriate radius of curvature of the preform that serves as the rear mold. Further, adjusting the multifocal layer curing conditions, e.g., ultraviolet light intensity and dosage, and adjusting the multifocal resin layer thickness are also examples of process variables that can be varied to achieve cosmetically acceptable multifocal layers for lenses with varying preform base curves.

EXAMPLE 1

Polycarbonate test lenses having base curves that matched approximately the molds used were cleaned with soap and water, dried and then treated with an oxygen plasma for 1 minute using a Plasmatech machine at a power setting of 100 Watts while introducing oxygen at a rate of 100 ml/min into the vacuum chamber of the Plasmatech machine. The lenses were then rinsed with deionized water and dried with air. A photochromic polyurethane coating composition was applied to the plasma treated lenses by spin coating (targeting a 0.22 gram wet weight) and thermally cured in an oven at 120° C. for one hour. The components of the polyurethane composition and their amounts are tabulated in Table 1. The photochromic polyurethane coating was approximately 20 microns thick. These lenses (preform) were used as one half (the rear half) of the mold set described below.

TABLE 1

| Formulation[1] | |
|---|---|
| Component/ | Weight Percent |
| Trixene 7960 (a) | 35.9 |
| PC 1122 (b) | 16.3 |
| Poly(meth)acrylic polyol (c) | 16.6 |
| Tinuvin 144 UV stabilizer (d) | 1.41 |
| A-187 (e) | 2.65 |
| N-methyl pyrrolidinone | 22.39 |
| Photochromic Material (f) | 4.24 |
| BYK-333 surfactant (g) | 0.04 |
| Dibutyltin dilaurate (h) | 0.53 |

(a) Dimethyl pyrazole blocked hexane diisocyanate biuret (Baxenden)
(b) Polyhexane carbonate diol (Stahl USA)
(c) A polyol produced by following the procedure of Composition D of Example 1 in U.S. Pat. No. 6,187,444 B1, which procedure is incorporated herein by reference, except that in Charge 2, the styrene was replaced with methyl methacrylate and 0.5% by weight, based on the total monomer weight, of triphenyl phosphate.
(d) Hindered amine light stabilizer (Ciba-Geigy)
(e) γGlycidoxypropyl trimethoxysilane (OSi)
(f) A mixture of naphthopyran photochromic materials in proportions designed to give a gray tint to the coating when activated by UV radiation.
(g) Surfactant (BYK)
(h) Catalyst (Aldrich)
[1]The photochromic materials and Tinuvin 144 were combined and this mixture blended with the N-methyl pyrrolidinone. The blend was stirred at 60° C. for approximately one hour. The remaining components of the formulation were then added and the resultant mixture stirred for an additional one hour at room temperature.

An optical resin composition was prepared by mixing 60 weight percent of NXT-7022 dendritic polyester methacrylate, 20 weight percent of dimethyl pyrazole (DMP) blocked isocyanatoethyl methacrylate, 20 weight percent hydroxyethyl methacrylate (HEMA) and 0.3 weight percent Irgacure 819 photoinitiator [BAPO (bis(2,4,6-trimethylbenzoyl) phenyl phosphine oxide) from Ciba-Geigy], based on solids in the composition. [NXT-7022 is reported by its supplier to be a dendritic polyester methacrylate prepared by methacrylating a polyester polyol having 16 terminal hydroxyl groups, of which approximately 85 to 90 percent on average are converted to methacrylate groups.]

Standard glass bifocal and trifocal molds (2.25, 4.50, 6.25 and 8.25 base) were cleaned with soap and water, and dried. A mold release agent, e.g., Rainex® from Unelko Corporation, was applied to the surface of the glass molds. The photochromic polyurethane coating on the test lenses was treated by plasma discharge using the Plasmatech machine and same conditions used to treat the uncoated SFSV lenses.

The appropriate mold release agent-containing glass mold was aligned with the plasma treated SFSV photochromic polyurethane coated preform lens and a mold clip was fastened to the glass mold-preform lens assembly. The mold-preform lens assembly was positioned so that the convex side of the glass mold was face down. A temporary opening between the preform and the glass mold was made to allow for a syringe tip to be inserted in the opening. The optical resin composition was injected into the space between the glass mold and the preform using the syringe until the space was ⅔ filled. The syringe was then removed while rotating the mold-preform lens assembly so that the convex side of the glass mold was face up. The pressure from the mold clip forced excess optical resin composition to exit from the side of the mold.

The glass mold-preform assembly containing the optical resin composition was exposed to UV radiation (two D lamps) for a time sufficient to harden the optical resin (<1 minute). The assembly was then placed in a thermal oven for a thermal post cure at 120° C. for 2 hours. The assembly was then allowed to cool to approximately 70° C. and the clip removed. The glass mold was removed while the assembly was still warm.

The test lenses were tested for adhesion and observed for optical cosmetic imperfections, particularly at the multifocal segment(s). Adhesion of the multifocal resin layer to the preform was tested by use of the standard cross hatch tape pull test. Based on this test, the cast resin was observed to adhere to the preform. The lenses were observed to have acceptable cosmetics. The lenses were exposed to ultraviolet light and found to change color. When the source of UV light was removed, the lenses returned to their original clear state.

Two of the test lenses, e.g., those that were prepared on 6.00 base curve lenses, were tested for photochromic response on an optical bench at 72° F. (22° C.). The average change in optical density value ($\Delta OD$) at 30 seconds, e.g., the change in optical density from the unactivated or bleached state to the activated or darkened state, for the lenses was 0.493; the average change in the optical density value at 900 seconds was 0.743. The average bleach rate (time to fade-photopic T½) was 74 seconds and the average second bleach rate (time to fade-$2^{nd}$ photopic T½) was 216 seconds. The change in optical density ($\Delta OD$) is determined according the formula $\Delta OD=\log (\% Tb/\% Ta)$, where % Tb is the percent transmittance in the bleached state, % Ta is the percent transmittance in the activated, and the logarithm is to the base 10. The bleach rate (T½) is the time interval in seconds for the $\Delta OD$ of the activated lens to reach one-half of the highest $\Delta OD$ after removal of the source of activating radiation. The second bleach rate ($2^{nd}$ T½) is the time interval in seconds for the $\Delta OD$ of the activated lens to reach one-quarter of the highest $\Delta OD$ after removal of the source of activating radiation.

EXAMPLE 2

The procedures of Example 1 were followed except that the optical resin composition comprised 70 weight percent of PRO-6169 dendritic polyester acrylate, 10 weight percent of DMP blocked isocyanatoethyl methacrylate, 10 weight percent of hydroxyethyl acrylate and 0.2 weight percent of Irgacure 819. PRO-6169 is reported by its supplier to be a dendritic polyester acrylate prepared by acrylating a polyester polyol having 16 terminal hydroxyl groups, of which approximately 85 to 90 percent on average are converted to acrylate groups. The PRO-6169 material is reported to have a number average molecular weight of 700 and a weight average molecular weight of 3000. In this example, two 2.00 base curve test lenses were used.

The test lenses were tested for adhesion and observed for optical cosmetic imperfections, particularly at the multifocal segment(s). Adhesion of the multifocal resin layer to the preform was tested by use of the standard cross hatch tape pull test. Based on this test, the cast resin was observed to adhere to the preform. The lenses were observed to have acceptable cosmetics. The lenses were exposed to ultraviolet light and found to change color. When the source of UV light was removed, the lenses returned to their original clear state.

The test lenses were tested for photochromic response on an optical bench at 72° F. (22° C.). The average change in optical density value ($\Delta OD$) at 30 seconds for the lenses was 0.544; the average change in the optical density value at 900 seconds was 0.742. The average bleach rate (time to fade-photopic T½) was 44 seconds and the average second bleach rate (time to fade-$2^{nd}$ photopic T½) was 105 seconds.

EXAMPLE 3

The procedure of Example 1 was followed except that the multifocal resin was prepared from a composition comprising 90% of NXT 7022 dendritic methacrylate, 10% DMP blocked isocyanatoethyl methacrylate and 0.3% of Irgacure 819, and lenses having 2.00, 6.00 and 8.00 base curves were used. The multifocal lenses prepared with the 6.00 and 8.00 base curve lenses had acceptable cosmetics.

EXAMPLE 4

The procedure of Example 1 was used except that the multifocal resin was prepared from a composition comprising 50% PRO-6169 dendritic acrylate, 20% polyethyleneglycol 400 dimethacrylate (SR-603 from Sartomer), 20% hydroxyethyl methacrylate, 10% DMP blocked isocyanatoethyl methacrylate and 0.3% Irgacure 819, and lenses having 2.00 base curves were used. The multifocal lenses prepared had acceptable lens cosmetics.

EXAMPLE 5

The procedure of Example 1 was used except that the multifocal resin was prepared from a composition comprising 50% PRO-6169 dendritic acrylate, 20% triethyleneglycol dimethacrylate, 20% hydroxyethyl methacrylate, 10% DMP blocked isocyanatoethyl methacrylate and 0.3% Irgacure 819, and lenses having 6.00 base curves were used. The multifocal lenses prepared had acceptable lens cosmetics.

Although the present invention has been described with reference to specific details of certain embodiments thereof, it is not intended that such details should be regarded as limitations upon the scope of the invention except insofar as they are included in the accompanying claims.

What is claimed is:

1. A multifocal optical article comprising:
   (a) a rigid optical substrate comprising thermoplastic polycarbonate,
   (b) a light influencing layer on at least a portion of at least one surface of said substrate comprising a photochromic polyurethane-based coating, and
   (c) a multifocal layer of an optical quality resin on said light influencing layer, wherein the multifocal layer comprises a transparent layer prepared from compositions comprising dendritic polyester (meth)acrylate.

2. The multifocal article of claim 1 wherein the optical article is a lens having a refractive index of from 1.48 to 1.74, and the multifocal layer is a bifocal or trifocal layer.

3. The multifocal article of claim 2 wherein the multifocal article further comprises an abrasion-resistant coating on the multifocal layer.

4. The multifocal article of claim 3 further comprising an antireflective coating on the abrasion-resistant coating.

5. The multifocal article of claim 3 wherein the abrasion-resistant coating comprises an organo silane.

6. The multifocal article of claim 2 wherein the light influencing layer is a photochromic layer and the photochromic layer comprises an organic photochromic coating containing a photochromic amount of at least one organic photochromic material.

7. The multifocal article of claim 6 wherein the organic photochromic material is chosen from materials comprising pyrans, chromenes, oxazines, fulgides, fulgimides, diarylethenes and mixtures of such photochromic materials.

8. The multifocal article of claim 7 wherein the organic photochromic material comprises a chromene, and the chromene is a naphthopyran chosen from naphtho[1,2-b]pyrans, naphtho[2,1-b]pyrans, spiro-9-fluoreno[1,2-b]pyrans, phenanthropyrans, quinopyrans or indeno-fused naphthopyrans; or the organic photochromic material comprises an oxazine and the oxazine is chosen from naphthoxazines and spiro (indoline)pyridobenzoxazines.

9. A method for preparing a multifocal optical article comprising positioning an optical quality curable resin between and in contact with a multifocal mold and a surface of a preform, said preform comprising a rigid optical substrate having at least one light influencing layer on at least a portion of at least one surface of the substrate, said light influencing layer comprising a photochromic polyurethane-based coating containing a photochromoic amount of at least one organic photochromic material, and curing said optical quality resin, thereby to provide a multifocal layer on the surface of said preform, wherein said rigid optical substrate is prepared from compositions comprising thermoplastic polycarbonate, and wherein said multifocal layer is prepared from compositions comprising dendritic polyester (meth) acrylate.

10. The method of claim 9 wherein the optical substrate is a lens having a refractive index of from 1.48 to 1.74, and the multifocal layer is chosen from a bifocal layer and a trifocal layer.

11. The method of claim 9 wherein the optical substrate is a lens having a refractive index of from 1.48 to 1.74, and the multifocal layer is a progressive layer.

* * * * *

(12) EX PARTE REEXAMINATION CERTIFICATE (6855th)
United States Patent
King et al.

(10) Number: US 7,258,437 C1
(45) Certificate Issued: Jun. 2, 2009

(54) PHOTOCHROMIC MULTIFOCAL OPTICAL ARTICLE

(75) Inventors: Eric M. King, Pittsburgh, PA (US); Kevin J. Stewart, Murrysville, PA (US)

(73) Assignee: Transitions Optical, Inc., Pinellas Park, FL (US)

Reexamination Request:
No. 90/009,074, Apr. 24, 2008

Reexamination Certificate for:
Patent No.: 7,258,437
Issued: Aug. 21, 2007
Appl. No.: 11/221,207
Filed: Sep. 7, 2005

(51) Int. Cl.
*G02C 7/10* (2006.01)
*G02C 7/06* (2006.01)

(52) U.S. Cl. .......................... 351/164; 351/168; 351/177
(58) Field of Classification Search .................. None
See application file for complete search history.

(56) References Cited

U.S. PATENT DOCUMENTS

2004/0096666 A1     5/2004   Knox et al.

FOREIGN PATENT DOCUMENTS

| WO | WO 93/08016 | 4/1993 |
| WO | WO 01/61382 A1 | 8/2001 |

*Primary Examiner*—Tuan H Nguyen

(57) ABSTRACT

Describes a multifocal optical article, e.g., an ophthalmic article such as a lens, in which the article includes (1) a rigid optical substrate, e.g., a transparent polymeric substrate, such as thermoset or thermoplastic substrate, adapted to possess at least one light influencing property on at least a portion of at least one surface of the substrate, e.g., a photochromic and/or polarizing layer, and (2) a multifocal layer of an optical quality material on said substrate having the light influencing property. Describes also the aforedescribed optical article having an abrasion-resistant coating on the multifocal layer, e.g., an abrasion-resistant coating comprising an organo silane. A method for preparing the multifocal optical article comprising curing optical quality material between a multifocal mold and preform comprising an optical substrate possessing the light influencing property is also described.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–11 is confirmed.

* * * * *